(12) United States Patent
Sakamoto

(10) Patent No.: US 9,076,046 B2
(45) Date of Patent: Jul. 7, 2015

(54) LANE RECOGNITION DEVICE

(75) Inventor: Yosuke Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 13/992,819

(22) PCT Filed: Nov. 18, 2011

(86) PCT No.: PCT/JP2011/076664
§ 371 (c)(1),
(2), (4) Date: Jun. 10, 2013

(87) PCT Pub. No.: WO2012/081359
PCT Pub. Date: Jun. 21, 2012

(65) Prior Publication Data
US 2013/0272577 A1    Oct. 17, 2013

(30) Foreign Application Priority Data

Dec. 15, 2010 (JP) ................. 2010-279630
Dec. 15, 2010 (JP) ................. 2010-279631
Oct. 19, 2011 (JP) ................. 2011-230110

(51) Int. Cl.
*G06K 9/00* (2006.01)
*G08G 1/16* (2006.01)
(Continued)

(52) U.S. Cl.
CPC ............ *G06K 9/00798* (2013.01); *G08G 1/167* (2013.01); *H04N 7/181* (2013.01);
(Continued)

(58) Field of Classification Search
CPC .......... G06K 9/00798; G06K 9/00791; G06K 9/4633; G06K 9/6205; G06T 2207/30256; G06T 211/203; G06T 7/0085; G06T 7/0083; G06T 2207/20061; B60R 1/06; B60R 2300/804; G01C 21/26; B60W 40/072; B60W 30/12
See application file for complete search history.

(56) References Cited

U.S. PATENT DOCUMENTS 5,359,666 A    10/1994    Nakayama et al.
6,813,370 B1   11/2004    Arai
(Continued)

FOREIGN PATENT DOCUMENTS

EP    2 040 196 A1    3/2009
JP    H08-249597 A    9/1996
(Continued)

OTHER PUBLICATIONS

Yifan He et al., "Real-Time Implementations of Hough Transform on SIMD Architecture", Distributed Smart Cameras, 2008, Second ACM/IEEE International Conference on, IEEE, Piscataway, NJ, USA, Sep. 7, 2008, pp. 1-8.
(Continued)

*Primary Examiner* — Amir Alavi
*Assistant Examiner* — Kenny Cese
(74) *Attorney, Agent, or Firm* — Carrier Blackman & Associates, P.C.; Joseph P. Carrier; Jeffrey T. Gedeon

(57) ABSTRACT

Provided is a lane recognition device capable of extracting linear elements derived from lane marks from a linear element extraction image obtained by processing a captured image and recognizing lane boundary lines. Local areas 47 are set for a lane extraction area 45 set in a linear element extraction image 40 that each of linear elements is included in one or a plurality of the local areas 47, having a predetermined size, and a local straight line 44 of each local area is determined (vx) and (ψ) associated with the direction and the intersection x with a predetermined reference horizontal line 46 are calculated for each local straight line 44. Each local straight line 44 is defined as one vote, being casted to (vx, ψ) of a voting space 56. Lane boundary lines are recognized from detection straight lines, whose direction and the intersection x determined based on vote results.

12 Claims, 14 Drawing Sheets

(51) Int. Cl.
*H04N 7/18* (2006.01)
*H04N 1/409* (2006.01)
*G06T 7/00* (2006.01)
*H04N 101/00* (2006.01)

(52) U.S. Cl.
CPC .......... *H04N2101/00* (2013.01); *H04N 1/4092* (2013.01); *G06T 2207/30256* (2013.01); *G06T 7/0085* (2013.01); *G06T 2207/10016* (2013.01); *G06T 2207/20136* (2013.01)

(56) References Cited

U.S. PATENT DOCUMENTS

| | | |
|---|---|---|
| 6,829,388 B1 | 12/2004 | Sakurai |
| 2002/0042676 A1 | 4/2002 | Furusho |
| 2009/0010482 A1* | 1/2009 | Nishida et al. ............... 382/100 |

FOREIGN PATENT DOCUMENTS

| | | |
|---|---|---|
| JP | 2001-076147 A | 3/2001 |
| JP | 2001-092970 A | 4/2001 |
| JP | 2003-331295 A | 11/2003 |
| JP | 2004-271404 A | 9/2004 |
| JP | 2005-182407 A | 7/2005 |
| JP | 3721594 B2 | 11/2005 |
| JP | 2008-027046 A | 2/2008 |

OTHER PUBLICATIONS

Ravi Rumar Satzoda et al., "Hierarchical Additive Hough Transform for Lane Detection", IEEE Embedded Systems Letters, IEEE, USA, vol. 2, No. 2, Jun. 2010, pp. 23-26.

Extended European search report dated May 20, 2014 issued in counterpart EP Patent Application 11848555.6.

* cited by examiner

LANE RECOGNITION DEVICE

TECHNICAL FIELD

The present invention relates to a lane recognition device adapted to recognize a lane on the basis of a captured image on the front of a vehicle obtained by an imaging device.

BACKGROUND ART

To assist driving, a view of a road condition ahead of a vehicle is imaged by an imaging device mounted in the vehicle, and a lane mark is detected by subjecting the captured image to image processing. There has been known conventional image processing for detecting a lane mark, which uses Hough transform.

Patent Document 1 discloses a road configuration estimating device adapted to detect a lane mark (lane indication line) from a captured image ahead of a vehicle by using a method other than the Hough transform. The road configuration estimating device sets a plurality of trapezoidal windows in the captured image such that the lane indication line is included therein, and detects edge points in the captured image by edge extraction processing. Then, the road configuration estimating device checks the number of the edge points on all segments, each of which has one point on the upper base and one point on the lower base of each window (two points facing each other in the direction of the lane) as both ends thereof, and detects the segment having the greatest number of edge points as the detection straight line of the window. Further, the road configuration estimating device determines whether the window indicates a vehicle from an adjacent lane entering into the traveling lane of a self-vehicle by determining whether the number of the edge points of the detection straight line of the window is a threshold value or more, and focuses on a window showing no entry of the vehicle, thus detecting a lane indication line of the entire captured image.

PRIOR ART DOCUMENT

Patent Document

Patent Document 1: Japanese Patent No. 3721594

DISCLOSURE OF THE INVENTION

Problems to be Solved by the Invention

The lane mark extraction from a captured image obtained by the Hough transform poses problems in that (a) the calculation load is heavy, (b) noises are easily picked up due to the dependence on point information, and (c) curved roads (curvy roads) cannot be detected.

According to the road configuration estimating device disclosed in Patent Document 1, if the comparison between the number of edge points on a detection straight line and a predetermined threshold value indicates that a detection straight line of a window is derived from a cutting-in vehicle, then the detection straight line can be properly excluded from the lane boundary lines to be recognized. For the road configuration estimating device, however, it is difficult to identify a detection straight line derived from something other than a cutting-in vehicle and also other than a lane mark and therefore difficult to exclude such a detection straight line from a lane boundary line to be recognized.

An object of the present invention is to provide a lane recognition device capable of accurately extracting linear elements derived from a lane mark from a linear element extraction image, in which linear elements derived from a non-lane-mark and linear elements derived from a lane mark are mixed, thereby recognizing a lane boundary line.

Means to Solve the Problems

To this end, a lane recognition device in accordance with the present invention is a lane recognition device that recognizes a lane on the basis of a captured image of a road ahead of a vehicle obtained by an imaging device, including: a linear element extraction image generating unit which generates a linear element extraction image into which linear elements included in the captured image have been extracted; an area setting unit which sets a lane extraction area in a predetermined range in a vertical direction in the linear element extraction image; a local straight line determining unit which determines a local straight line of each local area on the basis of a linear element part in each local area with respect to each local area in the lane extraction area; an intersection calculating unit which calculates an intersection of each local straight line and a reference horizontal line at a predetermined position in the vertical direction; a voting unit which votes on a direction and an intersection of each local straight line in a voting space having a direction and an intersection as coordinate components; a detecting unit which detects a detection straight line on the basis of a voting result in the voting space; and a recognizing unit which recognizes a lane boundary line based on the detection straight line (a first aspect of the invention).

According to the first aspect of the invention, the direction and the intersection with the reference horizontal line are calculated on each local straight line determined from each local area, and votes are cast to the direction and the intersection of each local straight line in the voting space. More votes are cast to a coordinate on a voting space associated with the direction and the intersection of a local straight line derived from a lane mark continuously laid on a road than a coordinate on a voting space associated with the direction and the intersection of a local straight line derived from a non-lane-mark, such as other vehicles locally existing on a road. Therefore, the difference in the number of votes between the two is conspicuous, thus making it possible to recognize a lane boundary line by accurately excluding linear elements derived from non-lane-marks.

In the first aspect of the invention, preferably, the area setting unit divides the linear element extraction image into a plurality of lane extraction areas in the vertical direction, the voting unit casts votes to each voting space associated with each lane extraction area on the basis of each local straight line of the lane extraction area associated with the voting space, the detecting unit detects the detection straight line for each lane extraction area on the basis of the voting result of each voting space, and the recognizing unit recognizes a lane boundary line in the linear element extraction image on the basis of connected detection straight lines of each lane extraction area (a second aspect of the invention).

According to the second aspect of the invention, the lane boundary line of a curve can be accurately recognized by the vertical connection of the detection straight lines of each lane extraction areas in the vertical direction.

In the second aspect of the invention, preferably, the area setting unit divides the linear element extraction image into a plurality of lane extraction areas in the vertical direction such that a vertical dimension of a lane extraction area at a higher level in the vertical direction becomes smaller (a third aspect of the invention).

In a range that is higher in the vertical direction in a captured image, the length on a real space corresponding to the length between adjoining pixel dots in the range becomes larger. According to the third aspect of the invention, in a lane extraction area that is higher in the vertical direction, the vertical dimension thereof is reduced. This equalizes a distance on the real space associated with each detection straight line in connecting the detection straight lines in the vertical direction, as compared with the case where the linear element extraction image is divided into a plurality of lane extraction areas having equal vertical dimensions, thus making it possible to equalize the accuracy of each portion of the connected detection straight lines after the connection.

In the second aspect of the invention, preferably, the local straight line determining unit divides the direction of a predetermined range into a first predetermined number of directional sections and determines the direction of each local straight line by assigning the direction of each local straight line to a corresponding directional section, the intersection calculating unit divides the reference horizontal line into a second predetermined number of positional sections and determines the intersection of each local straight line and the reference horizontal line by assigning the intersection to an intersectional section serving as a corresponding positional section, and the voting unit makes coordinate components of a direction and an intersection defined in the voting space coincide with the directional section and the intersectional section (a fourth aspect of the invention).

According to the fourth aspect of the invention, the coordinate components of the direction and the intersection in the voting space defined by the voting unit are set to coincide with the first and the second predetermined numbers of the directional sections and the intersectional sections defined on the directions and the intersections of the local straight lines, thereby accomplishing the matching between the directional sections and the intersectional sections of the local straight lines and the coordinate components of the directions and the intersections of the voting spaces. As a result, the load of processing for detecting a detection straight line of desired detection accuracy can be reduced.

In the fourth aspect of the invention, preferably, the first predetermined number or the second predetermined number is set to be smaller in a lane extraction area at a higher level than in a lane extraction area at a lower level (a fifth aspect of the invention).

In an image in the higher lane extraction area, the distance from the self-vehicle to a corresponding position on the real space is farther than an image in the lower lane extraction area. Hence, the accuracy of the difference in position in the real space that can be detected from the image in the lane extraction area at a higher level is lower than the accuracy in the difference in position in the real space that can be detected from the lane extraction area at a lower level. According to the fifth aspect of the invention, the first predetermined number or the second predetermined number is set to be smaller in the lane extraction area at a higher level than in the lane extraction area at a lower level, and the calculation processing on the direction or the intersection of a local straight line is carried out with a roughness based on the detection accuracy of the position in the real space from each image. As a result, wasteful processing carried out with higher accuracy than necessary on a lane extraction area of low detection accuracy on the direction or intersection can be prevented.

In the fourth aspect of the invention, preferably, the first predetermined number or the second predetermined number is set to be smaller in a local area at a higher level than in a local area at a lower level within the same lane extraction area (a sixth aspect of the invention).

In an image in a higher local area, the distance from the self-vehicle to the corresponding position on the real space is farther than in an image in a lower local area, so that the accuracy of the difference in position in the real space that can be detected from the image in the higher local area is lower than the accuracy of the difference in position in the real space that can be detected from the lower local area. According to the sixth aspect of the invention, the first predetermined number or the second predetermined number is set to be smaller in a higher local area than in a lower local area, and the calculation processing on the direction or the intersection of a local straight line is carried out according to a roughness based on the detection accuracy of the position in the real space from each image. As a result, wasteful processing carried out with higher accuracy than necessary on a local area of low detection accuracy on the direction or intersection can be prevented.

In the first aspect of the invention, preferably, the detecting unit detects, as a detection straight line, a straight line that has a direction and an intersection associated with a coordinate having a maximum number of votes in the voting space (a seventh aspect of the invention).

According to the seventh aspect of the invention, detection straight lines derived from lane marks can be accurately detected from a linear element extraction image, in which the linear elements of dashed-line lane marks and continuous-line lane marks are mixed, by detecting a detection straight line based on a maximum number of votes rather than the comparison between the number of votes and a predetermined threshold value in the voting space.

In the first aspect of the invention, preferably, a horizontal direction of the captured image corresponds to a lateral direction of the vehicle in the real space, and the recognizing unit recognizes that a lane boundary line is curved in a case where the recognizing unit determines that the detection straight line is changing at a velocity of a threshold value or more in the horizontal direction on the linear element extraction image on the basis of time-series linear element extraction images (an eighth aspect of the invention).

According to the eighth aspect of the invention, a curved lane can be accurately recognized from the horizontal direction velocity of a detection straight line.

In the first aspect of the invention, preferably, the linear element extraction image generating unit includes an intermediate extraction image generating unit which generates a first intermediate extraction image into which a linear element contained in the captured image has been extracted and a segment replacing unit which substitutes each linear element contained in the first intermediate extraction image into one or a plurality of segments on the basis of a vertical change in a horizontal width or a tilt angle thereof so as to generate the linear element extraction image from the first intermediate extraction image (a ninth aspect of the invention).

When traveling on a curve, the lane boundary line is curved, so that the directions and the intersections of local straight lines in a plurality of local areas in a lane extraction area are scattered with respect to one lane boundary line. This scattering leads to the scattering of the coordinates of the voting space to which votes are to be cast, thus making it difficult to detect detection straight lines by voting. According to the ninth aspect of the invention, the intermediate extraction image generating unit generates a first intermediate extraction image into which a linear element contained in the captured image has been extracted and the segment replacing unit substitutes each linear element contained in the first intermediate extraction image into one or a plurality of segments on the basis of a vertical change in the horizontal width or the tilt angle thereof so as to generate the linear element extraction image. As a result, the local straight line determiner will determine a local straight line on the basis of a segment that has replaced a curved linear element, thus restraining the scattering of targets to which votes are to be cast in the voting space. This enables the detecting unit to smoothly detect a detection straight line on the basis of a voting result in the voting space.

In the ninth aspect of the invention, preferably, the intermediate extraction image generating unit generates a second intermediate extraction image extracted from the captured image while holding a linear element included in the captured image at the same position as the position in the captured image, and projectively transforms the second intermediate extraction image into a top-view image thereby to generate the first intermediate extraction image (a tenth aspect of the invention).

According to the tenth aspect of the invention, the second intermediate extraction image is projectively transformed into a top-view image to generate the first intermediate extraction image. This arrangement removes a deformation of the configuration of a linear element on the first intermediate extraction image attributable to the distance from the vehicle, bringing the configuration of the linear element close to the configuration in the real space. As a result, each linear element can be substituted into a proper segment, permitting improved accuracy of a local straight line determined on the basis of the replaced segment.

In the first aspect of the invention, preferably, the voting unit sets the voting space for a time-series lane extraction area that has been set for the time-series linear element extraction image generated in association with a time-series captured image, and casts votes on the direction and intersection of the local straight line of each local area in the lane extraction area, in which the voting space has been set, for each of the time-series voting spaces, and the detecting unit detects a detection straight line on the basis of a voting result in a time-series voting space (an eleventh aspect of the invention).

According to the eleventh aspect of the invention, a linear element derived from a lane mark in a linear element extraction image exhibits high continuity of emergence in a time-series linear element extraction image, whereas a linear element derived from a non-lane-mark in a linear element extraction image exhibits low continuity of emergence in a time-series linear element extraction image. Therefore, the detection accuracy of a detection straight line corresponding to a lane mark can be enhanced by setting a voting space for each time-series lane extraction area set for a time-series linear element extraction image and by casting a vote to a coordinate associated with a local straight line of each local area so as to detect a detection straight line on the basis of a voting result in the time-series voting space.

In the eleventh aspect of the invention, preferably, the detecting unit prepares a total voting space in which the number of the votes on individual coordinates becomes a total value obtained by summing up the numbers of votes on corresponding coordinates in the individual time-series voting spaces, and detects the detection straight line on the basis of a coordinate having a maximum number of votes in the total voting space (a twelfth aspect of the invention).

According to the twelfth aspect of the invention, a linear element derived from a lane mark in a linear element extraction image exhibits high continuity of emergence in a time-series linear element extraction image. Hence, the number of votes on the coordinates corresponding to a lane mark in the total voting space will be considerably larger than the number of votes on the coordinates corresponding to temporary noises or the like. Further, in the total voting space, the number of votes on the coordinates corresponding to a lane mark will be larger than the number of votes on the coordinates in the surrounding area thereof, and the number of votes on the coordinate corresponding to the lane mark with respect to the number of votes becomes maximum. Thus, the accuracy for detecting the detection straight line corresponding to a lane mark can be enhanced by detecting the detection straight line on the basis of the coordinate having the maximum number of votes in the total voting space.

In the twelfth aspect of the invention, preferably, the detecting unit reduces the number of votes on a coordinate that is below a threshold value in each voting space and then totalizes the numbers of votes on the individual coordinates in the individual time-series voting spaces (a thirteenth aspect of the invention).

In each voting space, the number of votes on a coordinate corresponding to a noise or the like is smaller than the number of votes on a coordinate corresponding to a lane mark. In some cases, however, the number of votes on a coordinate corresponding to a noise or the like reaches an unignorable number of votes in the total voting space, in which the votes on each coordinate in each voting space are accumulated. To cope with this, according to the thirteenth aspect of the invention, the detecting unit first reduces the number of votes on a coordinate that is below a threshold value in each voting space and then totalizes the number of votes on each coordinate in each time-series voting space. Thus, in the total voting space, the number of votes derived from noises will be a sufficiently smaller value than the number of votes derived from a lane mark, making it possible to restrain the detection straight line derived from noises from being detected in the total voting space.

In the thirteenth aspect of the invention, preferably, the detecting unit compares the voting results of the first and the second voting spaces at different clock times on a time series, and in a case where a coordinate within a predetermined distance range from a coordinate having a maximum number of votes in the first voting space does not have a maximum number of votes in the second voting space, the detecting unit excludes the number of votes on the coordinate in the first voting space from the total in the total voting space (a fourteenth aspect of the invention).

The possibility of the continuous emergence of a linear element derived from a non-lane-mark, such as a noise, in a time-series straight line element extraction image is low. Hence, when the voting results in the first and the second voting spaces at different clock times on a time series are compared, it frequently happens that a coordinate within a predetermined distance range from a coordinate having a maximum number of votes in the first voting space does not have a maximum number of votes in the second voting space. According to the fourteenth aspect of the invention, if the number of votes on a second coordinate within a predetermined distance range from a first coordinate in the first voting space is not a maximum value in the second voting space, then the number of votes on the first coordinate in the first voting space is excluded from the total in the total voting space. This makes it possible to prevent a detection straight line derived from a noise or the like from being detected from the total voting space.

MODE FOR CARRYING OUT THE INVENTION

Figure 1:
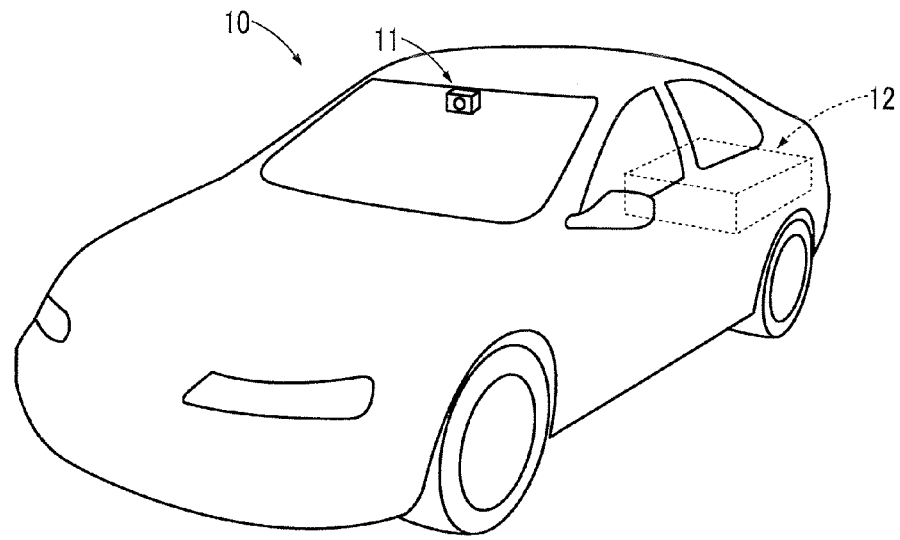
FIG. 1 is a schematic diagram illustrating a vehicle provided with a vehicle travel assisting device.

A vehicle (four-wheeled vehicle) 10 shown in FIG. 1 has a camera (imaging device) 11, such as a CCD camera, a CMOS image sensor or a near-infrared camera, and a vehicle travel assisting device 12. The camera 11 is installed in the vehicle to capture, through a windshield, an image of a condition ahead of the vehicle 10. The place where the camera 11 is disposed may be changed, as necessary, and may be placed on a dashboard, front portion or the like of the vehicle 10.

Figure 2:
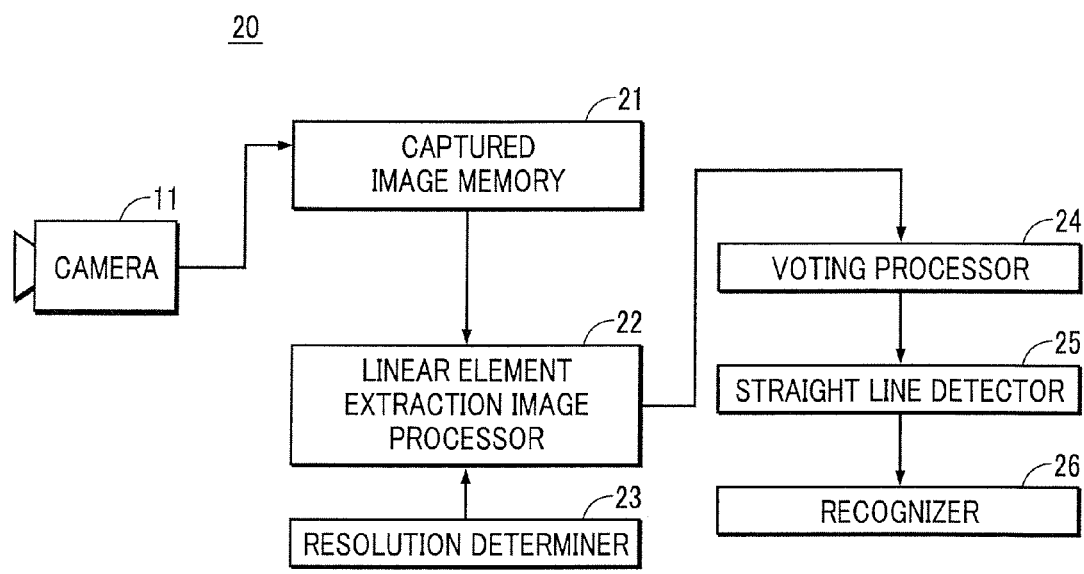
FIG. 2 is a block diagram illustrating a lane recognition device installed in the vehicle travel assisting device.

In FIG. 2, a lane recognition device 20 installed in the vehicle travel assisting device 12 is provided with a captured image memory 21, a linear element extraction image processor 22, a resolution determiner 23, a voting processor 24, a straight line detector 25, and a recognizer 26.

The linear element extraction image processor 22 corresponds to the linear element extraction image generating unit, the area setting unit, the local straight line determining unit and the intersection calculating unit in the present invention. The voting processor 24 corresponds to the voting unit in the present invention. The straight line detector 25 corresponds to the detecting unit in the present invention.

The lane recognition device 20 includes a computer (not shown) having memories for computation and memories for storing programs and implements the functions of the linear element extraction image processor 22, the resolution determiner 23, the voting processor 24, the straight line detector 25 and the recognizer 26 by carrying out software information processing in the computer. The functions of the sections constituting a lane recognition device 65 (FIG. 7) and a lane recognition device 100 (FIG. 16), which will be discussed hereinafter, are also implemented by the software information processing in the computer.

Figure 3:
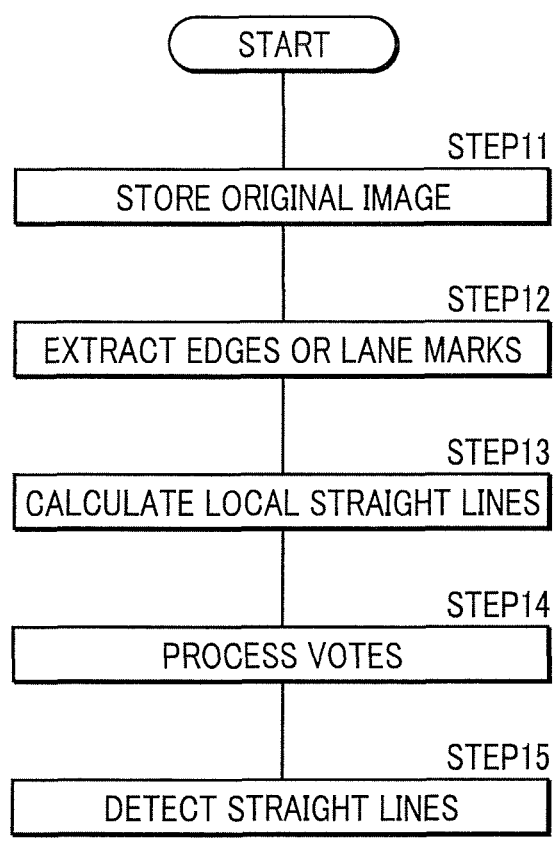
FIG. 3 is a flowchart illustrating a lane recognition method implemented by the lane recognition device in FIG. 2.

FIG. 3 is the flowchart of a lane recognition method carried out by the lane recognition device 20. Referring to the flowchart of FIG. 3, the actuation of the lane recognition device 20 will be described.

The processing by the linear element extraction image generating unit in the present invention corresponds to the processing in STEP12. The processing by the area setting unit, the local straight line determining unit and the intersection calculating unit in the present invention corresponds to the processing in STEP13. The processing by the voting unit in the present invention corresponds to the processing in STEP14. The processing by the detecting unit in the present invention corresponds to the processing in STEP15.

In STEP11, the lane recognition device 20 stores the data of a captured image 30 in the captured image memory 21. The captured image 30 will be described with reference to FIG. 4. In the captured image 30 and a linear element extraction image 40 thereof in FIG. 4 and FIG. 9, FIG. 12, FIG. 14 and FIG. 15, which will be discussed later, the horizontal direction (the direction of the axis of abscissas or a lateral direction) is defined as an x-axis direction, the vertical direction (the up and down direction or the direction of the axis of ordinates) is defined as a y-axis direction, and the origin is defined as the apex at the bottom left of each rectangular image for the convenience of processing. The x-axis direction corresponds to the lateral direction of the vehicle 10 in a real space. The y-axis direction corresponds to the advancing direction and the vertical direction of the vehicle 10 in the real space. Accordingly, in the real space, a place farther ahead of the vehicle 10 and a place that is higher in the vertical direction are positioned at higher levels in the y-axis direction. In this example, the vehicle 10 is traveling on a lane on the right side.

Figure 4:
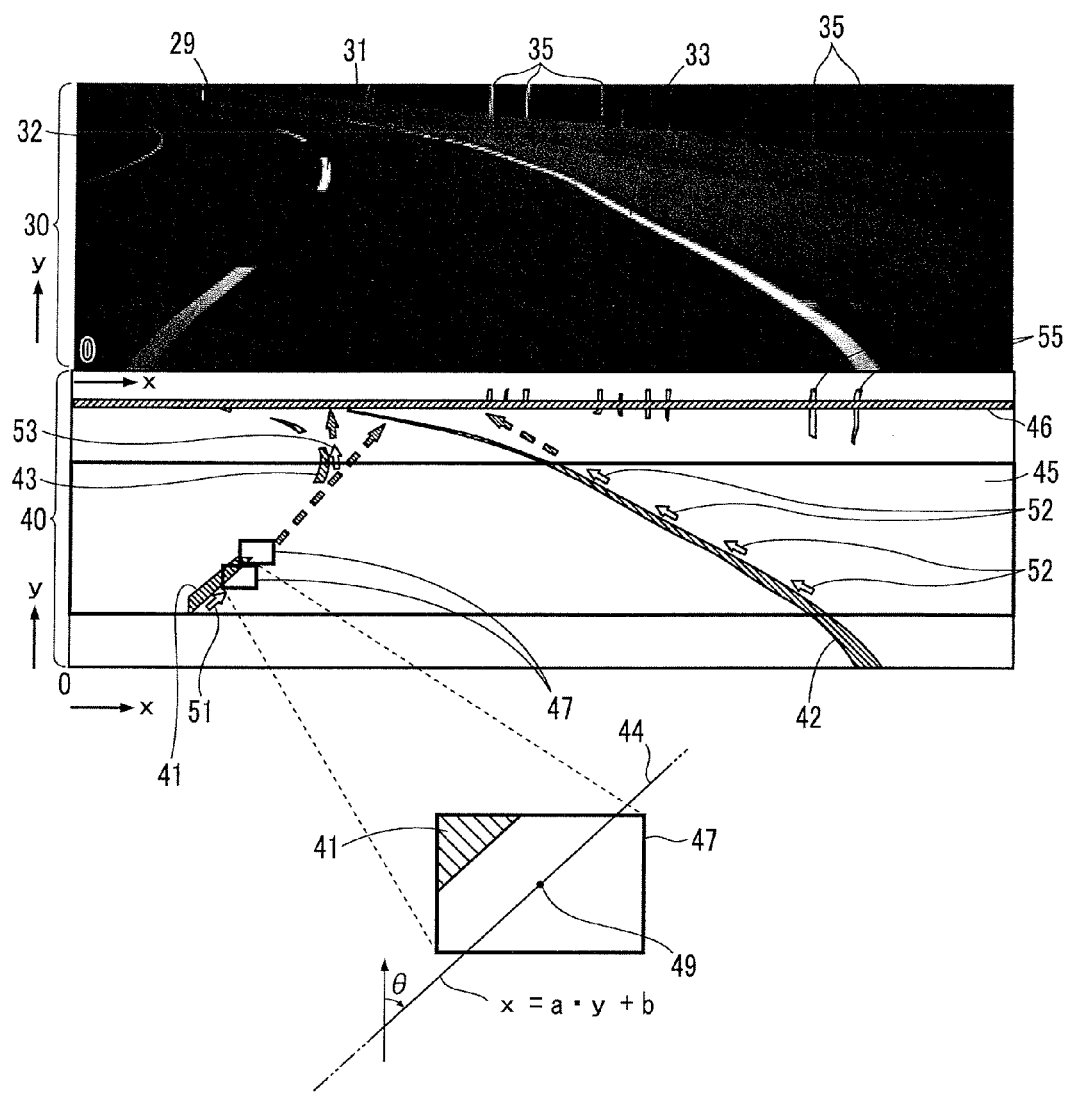
FIG. 4 is a diagram illustrating a captured image and a linear element extraction image thereof, which are vertically arranged.

In FIG. 4, the upper half illustrates the captured image 30 of a view ahead of the vehicle 10, which has been taken by the camera 11, while the lower half illustrates the linear element extraction image 40 generated by carrying out linear element extraction processing, such as edge processing, on the captured image 30. The camera 11 outputs the captured image 30 showing the view ahead of the vehicle 10 at regular time intervals. Each captured image 30 corresponds to one frame. Each of the linear elements in the linear element extraction image 40 is formed of a set of pixel dots extracted from the captured image 30. More specifically, each linear element forms an area of a plurality of extracted pixel dots linearly gathering at a high density or in succession among the extracted pixel dots distributed in the linear element extraction image 40.

The captured image 30 shows a left lane mark 32, a central lane mark 31, and a right lane mark 33 in order from the left side to the right side, as observed from the self-vehicle, regarding a road 29 on which the vehicle 10 is currently traveling. In this example, the central lane mark 31 is a dashed-line type, whereas the left and the right lane marks 32 and 33 are continuous-line type. The captured image 30 further shows a plurality of tree trunks 35 along the road 29 on the right side of the road 29.

In STEP12, the linear element extraction image processor 22 extracts edges or lane marks from the captured image 30. To be more specific, the linear element extraction image processor 22 carries out the edge processing or the lane mark extraction processing on the captured image 30 to generate the linear element extraction image 40. According to a specific example of the edge processing, each coordinate G (x, y) of the captured image 30 is subjected to filtering by, for example, a Sobel operator, to determine a first derivation in the x-axis direction, a value Sx (x, y) thereof is defined as the density value of G (x, y). Then, a threshold value Cs and Sx (x, y) are compared to extract a pixel dot to which Sx (x, y)>Cs applies, and the pixel dot is determined as an edge dot. The pixel dot is displayed in a different color from a background color to provide the linear element extraction image 40.

In a specific example of the processing for extracting a lane mark, only pixel dots in a white color (the color of a lane mark) are extracted or pixel dots having brightness of a predetermined threshold value or more are extracted from the captured image 30, and the extracted pixel dots are displayed in a different color (e.g., white) from the background color (e.g., black) to form the linear element extraction image 40.

In the linear element extraction image 40, the central lane mark 31 and the right lane mark 33 of the captured image 30 are extracted as the linear elements 41 and 42, respectively. A plurality of linear elements 55 of the linear element extraction image 40 corresponds to the tree trunks 35 included in the distant view in the captured image 30. A lane extraction area 45 is set as the range of a predetermined dimension in the y-axis direction in the linear element extraction image 40. The dimension of the lane extraction area 45 in the y-axis direction may be adjusted, as necessary, according to the driving situation, the traveling situation or the like of the vehicle 10 rather than being fixed. If the road 29 is a straight track, then various adjustments, such as the orientation, of the camera 11 are made such that the images of the road range, for example, from a few meters to a few tens of meters, ahead of the vehicle 10 will be included in the captured image 30.

A reference horizontal line 46 is set at a position in the y-axis direction that is above the upper side of the lane extraction area 45 in the linear element extraction image 40, and extends in parallel to the x-axis. The reference horizontal line 46 may be set in the lane extraction area 45 or may be set out of the linear element extraction image 40 and may be set, for example, at above the upper side of the linear element extraction image 40, in arithmetic processing.

A plurality of local areas 47 is set in the lane extraction area 45 such that they are not overlapped with each other and that they adjoin to each other in a range that includes linear elements. The local areas 47 correspond to the windows in Patent Document 1 described above. In the example of FIG. 4, the local areas 47 have rectangular profiles that are congruent to each other. Alternatively, however, the local areas 47 may have shapes other than the rectangle, or each of the local areas 47 may have a different shape or dimensions while assigning the voting right of one vote, which is to be cast to a voting space 56 (FIG. 5) to be discussed hereinafter, to each of the local areas 47.

Although the local areas 47 may be densely distributed over the entire surface of the lane extraction area 45, the local areas 47 are typically set to be focused on the portion of each linear element and also set such that each linear element is fully covered by one or more local areas 47 in the lane extraction area 45. The setting of the local areas 47 in a range wherein no linear element exists is omitted. In the case where the local areas 47 are distributed in a grid over the entire surface of the lane extraction area 45, if there are any local areas 47 from which local straight lines 54, which will be discussed hereinafter, cannot be extracted because the local areas 47 do not include linear element portions, then the voting right thereof relative to the voting space 56, which will be discussed hereinafter, will be set to zero votes, i.e., no voting right will be given. If the local straight line 54 has been extracted from a local area 47, then the voting right thereof relative to the voting space 56 will be one vote in the present embodiment.

Only two local areas 47 relative to the linear element 41 are shown in FIG. 4. However, in actual processing, the local areas 47 are set in other portions of the linear element 41 and a portion of a linear element 42 in the lane extraction area 45. Desired detection segments 51, 52 and 53 correspond to the detection straight line portions desired to be detected from the portions of linear elements 41, 42 and 43 in the lane extraction area 45, which are indicated for reference as ideal detection straight lines to be detected by the straight line detector 25. The linear elements 55 existing outside the lane extraction area 45 are excluded from the objects to be subjected to local straight line determination processing, which will be discussed hereinafter, carried out on the lane extraction area 45. Further, the desired detection segment 53 is excluded from the detection straight lines of the lane extraction area 45, because the number of votes of a corresponding coordinate is below a threshold value V1.

In STEP13, the linear element extraction image processor 22 calculates the local straight line 44. To be more specific, for each local area 47, one straight line is determined as the local straight line 44 on the basis of the distribution of extracted pixel dots in the area. The local straight line 44 is defined as the straight line that passes the local area 47 and has a tilt angle (θ to be discussed hereinafter) extracted from a linear element portion in the local area 47 as the tilt angle of the linear element portion.

The local straight line 44 in each local area 47 can be calculated by, for example, applying the least squares method or the like to the coordinate of each extracted pixel dot in the local area 47. For example, the total of the values obtained by squaring the distance between each of all pixel dots, which constitute the linear element portions existing in each local area 47 among labeled linear elements, and the straight line is calculated. Then, the straight line having a minimum total is found, and the found straight line is defined as the local straight line 44 in the local area 47.

As in the device disclosed in Patent Document 1, all segments connecting one point on the upper side and one point on the lower side of the local area 47 may be taken, and a straight line that overlaps a segment having a maximum value of extracted pixel dots among segments may be defined as the local straight line 44 of the local area 47.

The local straight line 44 is expressed by x=a·y+b, wherein "a" denotes the tilt of the local straight line 44, and a=increment in the x-axis direction/increment in the y-axis direction. In the calculation of the local straight line 44 in STEP13, the linear element extraction image processor 22 first determines only "a" by the aforesaid least squares method or the like and then decides on a predetermined dot in a local area, through which the local straight line 44 passes, so as to determine b. The method for determining b will be described hereinafter.

θ related to ψ used for a voting process in the voting space 56 (FIG. 5), which will be described hereinafter, is defined as the tilt angle of the local straight line 44 in the clockwise direction with respect to the positive direction of the y-axis, and has a relationship of tan θ=a. θ is defined within the range of 0 to π and corresponds to the "direction" of the local straight line 44.

The linear element extraction image processor 22 then calculates the x coordinate of the intersection (hereinafter referred to as "the x intersection") of each local straight line 44 and the reference horizontal line 46. The specific calculation method is as indicated by the following STEP131 to STEP133. The linear element extraction image processor 22 carries out STEP131 to STEP133 as the sub-steps of STEP13 in FIG. 3.

STEP131: The local straight line is expressed by x=a·y+b, and b is calculated according to expression (1) given below.

$$b = xc - a \cdot yc \quad \text{expression (1)}$$

where (xc, yc) denotes the coordinate of a predetermined dot, e.g., a central dot 49, in the local area 47 in which each of the local straight lines 44 have been originally generated.

STEP132: The x-coordinate ux (the x intersection) of the intersection (ux, uy) of the local straight line 44 and the reference horizontal line 46 is calculated according to expression (2) given below by using b calculated according to expression (1).

$$ux = a \cdot uy + b \quad \text{expression (2)}$$

uy denotes a predetermined value as the y-coordinate at a predetermined position through which the reference horizontal line 46 passes, as described above.

STEP133: Based on ux and θ, ψ and vx are calculated according to expressions (3) and (4) given below.

$$\psi = (\theta/\text{maximum value assumed for } \theta) \times (\text{number of sections Nc of } \psi) \quad (3)$$

$$vx = (ux/\text{maximum value assumed for } ux) \times (\text{number of sections Nx of } vx) \quad (4)$$

Nc and Nx in expressions (3) and (4), respectively, are determined on the basis of the position resolution of an area of interest in the captured image 30. The position resolution of the area of interest in the captured image 30 refers to the resolution for identifying, from the image information on the area of interest, the difference from the position in the real space corresponding to the area of interest in the captured image 30. As the position resolution of the area of interest in the captured image 30 increases, Nc and Nx can be increased. The Nc and Nx are, for example, 32 and 64, respectively.

Regarding ψ and vx in expressions (3) and (4), respectively, a value below 1 will be cut off, and if ψ=Nc, then ψ will be reduced by 1. If vx=Nx, then vx will be reduced by 1. Therefore, ψ is denoted by an integer within the range of [0, Nc−1], whereas vx is denoted by an integer within the range of [0, Nx−1].

The resolution determiner 23 determines Nc and Nx on the basis of the resolution of the captured image 30 and outputs the results to the linear element extraction image processor 22. The linear element extraction image processor 22 calculates vx and ψ of the local straight line 44 of each local area 47 on the basis of Nc and Nx from the resolution determiner 23, and relates the calculated vx and ψ to the local area 47 and stores them in a memory of the linear element extraction image processor 22.

Figure 5:
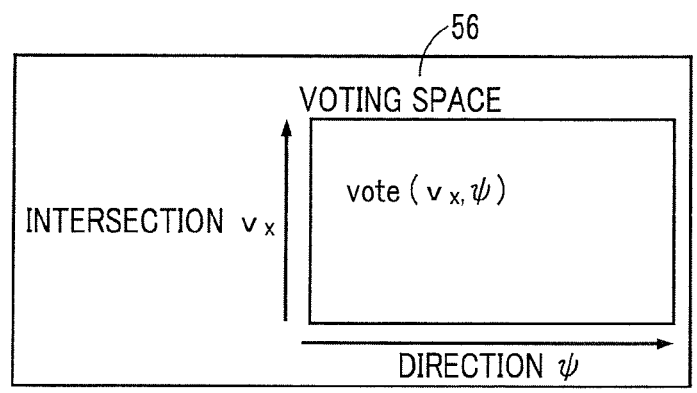
FIG. 5 is a schematic diagram illustrating a voting space.

FIG. 5 illustrates the voting space 56. The axis of abscissas and the axis of ordinates of the voting space 56 are defined by ψ and vx, respectively. ψ is associated with the tilt angle θ, so that the axis of abscissas denoting the axis of ψ in the voting space 56 is referred to as a directional axis. Further, vx is associated with ux denoting the x intersection, as defined by expression (4) mentioned above, so that the axis of ordinates denoting the axis of vx in the voting space 56 is referred to as the intersection axis.

In STEP14, the voting processor 24 refers to vx and ψ of each of the local area 47 stored in the memory of the linear element extraction image processor 22 and casts votes to the voting space 56 on the basis of reference values. More specifically, one vote is assigned to each of the local area 47, and one vote is cast to the coordinate (vx, ψ) of the voting space 56 that coincide with vx and ψ of the local straight line 44 of the local area 47.

Figure 6:
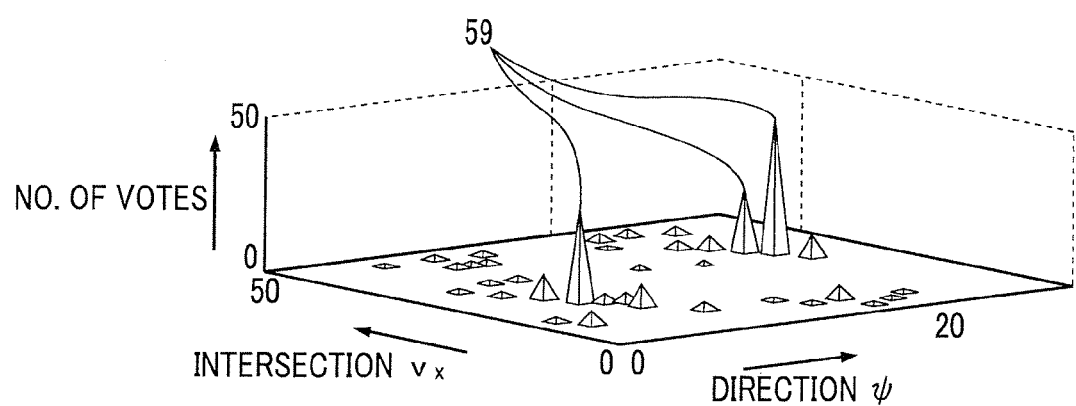
FIG. 6 is a diagram illustrating the voting space in a three-dimensional mode, the numbers of votes in each coordinate being indicated by height.

The numbers of votes vote (vx, ψ) cast to each coordinate (vx, ψ) denoting the voting result in the voting space 56 are illustrated in FIG. 6. The numbers of votes vote (vx, ψ) cast to the coordinates in the voting space 56 are indicated by height in FIG. 6. In the voting space 56 in which the numbers of votes vote (vx, ψ) are indicated by height, a plurality of mountains 59 emerge. The mountains 59 emerge in coordinate areas in which the numbers of votes vote (vx, ψ) are increasing relative to the surroundings thereof. The results of the numbers of votes vote (vx, ψ) regarding the local straight line 44 corresponding to a lane mark are shaped into a mountain expanding downwards from its summit formed of a coordinate having a height of a maximum value.

The number of votes cast to the coordinate at which vote (vx, ψ) reaches the maximum value in the voting space 56 is sufficiently close to the quantity of the local areas 47 assigned to the linear elements 41, 42 and 43 shown in the lane extraction area 45.

In STEP15, the straight line detector 25 detects a detection straight line on the basis of the voting result in the voting space 56. The detection straight line is the straight line in which the x intersection is ux associated with vx according to the aforesaid expression (4) with respect to the coordinate (vx, ψ) at which the number of votes vote (vx, ψ) is the threshold value V1 or more and also a maximum value and the direction thereof is θ associated with ψ according to the aforesaid expression (3). Alternatively, a condition in which coordinates (vx, ψ) of a predetermined numbers of top maximum values, e.g., two or three top maximum values, in the voting space 56 may be added, and the straight lines associated with the limited predetermined number of top coordinates may be taken as the detection straight lines.

The maximum value of vote (vx, ψ) of a local straight line derived from the linear element 43 in the voting space 56 is below V1, so that the local straight line will not be detected as a detection straight line. In the example of the linear element extraction image 40 in FIG. 4, only the local straight lines derived from the linear elements 41 and 42 are detected from the voting space 56 as the two detection straight lines in the linear element extraction image 40.

The recognizer 26 recognizes the detection straight lines as the central lane mark 31 and the right lane mark 33 on the captured image 30 and also recognizes the relative position and the profile of the lane boundary line of the road 29 in relation to the vehicle 10.

The recognizer 26 is also capable of simply determining whether the road 29 on which the vehicle 10 is traveling is curved, independent of the recognition of the lane boundary line of the road 29. The specific determination processing will be described.

According to the method for recognizing the straight lane boundary line shown in FIG. 3, a series of processing in FIG. 3 is carried out for each captured image 30 taken by the camera 11. The camera 11 captures the image of the view ahead of the vehicle 10 at regular time intervals, so that a time series of captured images 30 is obtained. The recognizer 26 determines whether the road on which the vehicle 10 is currently traveling is straight or curved from a predetermined number of time-series captured images 30.

More specifically, if the recognizer 26 determines that the lane boundary line recognized from the predetermined number of time-series captured images 30 is moving at a mean velocity (the mean velocity may be either the mean velocity in the captured image 30 or a mean velocity converted into the real space) below a threshold value D in the x-axis direction, then the recognizer 26 recognizes that the road 29 is straight. Conversely, if it is determined that the lane boundary line is moving at a mean velocity of the threshold value D or more in the x-axis direction, then it is recognized that the road 29 is curved.

Figure 7:
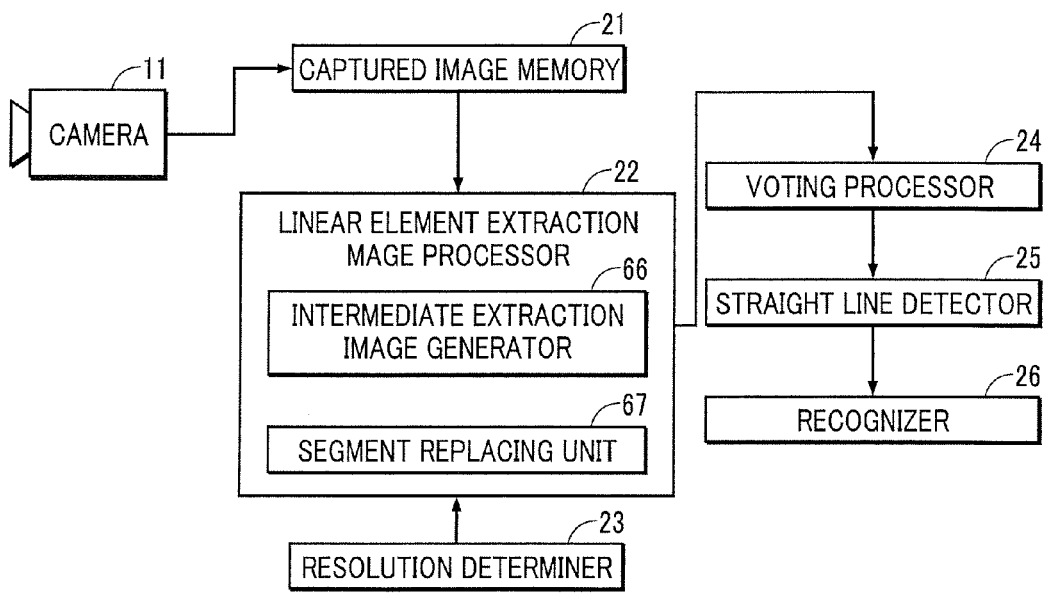
FIG. 7 is a block diagram illustrating another lane recognition device.

FIG. 7 is a block diagram of another lane recognition device 65. In the linear element extraction image 40 in FIG. 4 described in association with the lane recognition device 20 in FIG. 2, the tilt angles θ of local straight lines in a plurality of local areas 47 occupying the area of a curved linear element, such as the linear element 42, are scattered, and the votes in the voting space 56 are accordingly scattered, making it difficult to determine detection straight lines associated with the linear element 42 from the voting space 56. To cope with the difficulty, the lane recognition device 65 is adapted to restrain the votes based on the local straight lines 44 derived from the linear elements of a curve of the linear element extraction image 40 from scattering in the voting space 56.

The lane recognition device 65 differs from the lane recognition device 20 in that the lane recognition device 65 is provided with an intermediate extraction image generator 66 and a segment replacing unit 67 in the linear element extraction image processor 22. The intermediate extraction image generator 66 carries out the processing in STEP12 among the processing carried out in STEP12 and STEP13 of FIG. 3 by the linear element extraction image processor 22 of the lane recognition device 20 in FIG. 2, and no additional new processing is carried out with respect to the linear element extraction image processor 22 of the lane recognition device 20. In other words, the intermediate extraction image generator 66 merely carries out STEP12 to generate the linear element extraction image 40 in FIG. 4.

Figure 8:
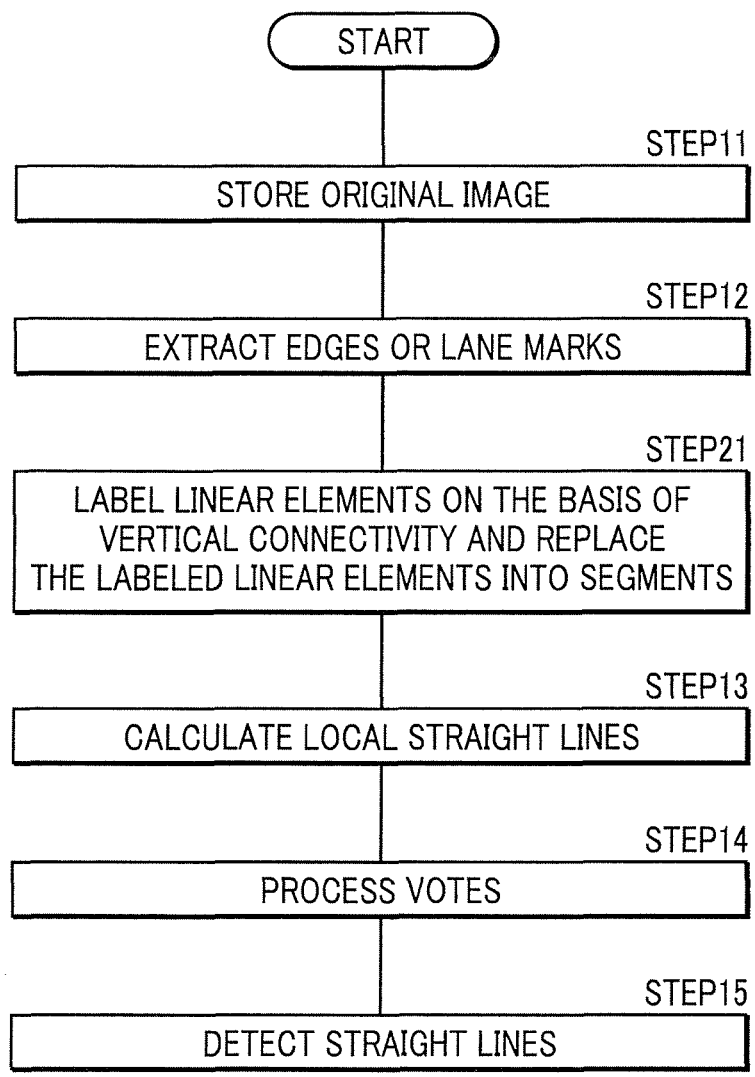
FIG. 8 is a flowchart illustrating a lane recognition method implemented by another lane recognition device in FIG. 7.

FIG. 8 is the flowchart of the lane recognition method carried out by the lane recognition device 65. The flowchart in FIG. 8 is comprised of the flowchart in FIG. 3 to which STEP21 has been added between STEP12 and STEP13. In FIG. 7 and FIG. 8, the description of the same parts as those in FIG. 2 and FIG. 3 will be omitted and only different aspects will be described.

In STEP21, the segment replacing unit 67 substitutes the linear elements included in the linear element extraction image 40 into one or a plurality of segments on the basis of the connectivity in the vertical direction.

A specific example of the processing in STEP21 will be described with reference to FIG. 9. As with FIG. 4, the upper half of FIG. 9 illustrates the captured image 30 of the view ahead of the vehicle 10 taken by the camera 11, while the lower half illustrates the linear element extraction image 40 generated by carrying out the linear element extraction processing such as the edge processing or the like on the captured image 30.

In the lane recognition device 65, the linear element extraction image 40 which has been generated by carrying out the linear element extraction processing, such as edge processing, on the captured image 30 and which is before being subjected to the segment substitution processing in STEP21 corresponds to the first intermediate extraction image generated by the intermediate extraction image generating unit in the present invention. Further, the linear element extraction image 40 after being subjected to the segment substitution processing in STEP21 corresponds to the linear element extraction image generated by the segment replacing unit in the present invention.

Figure 9:
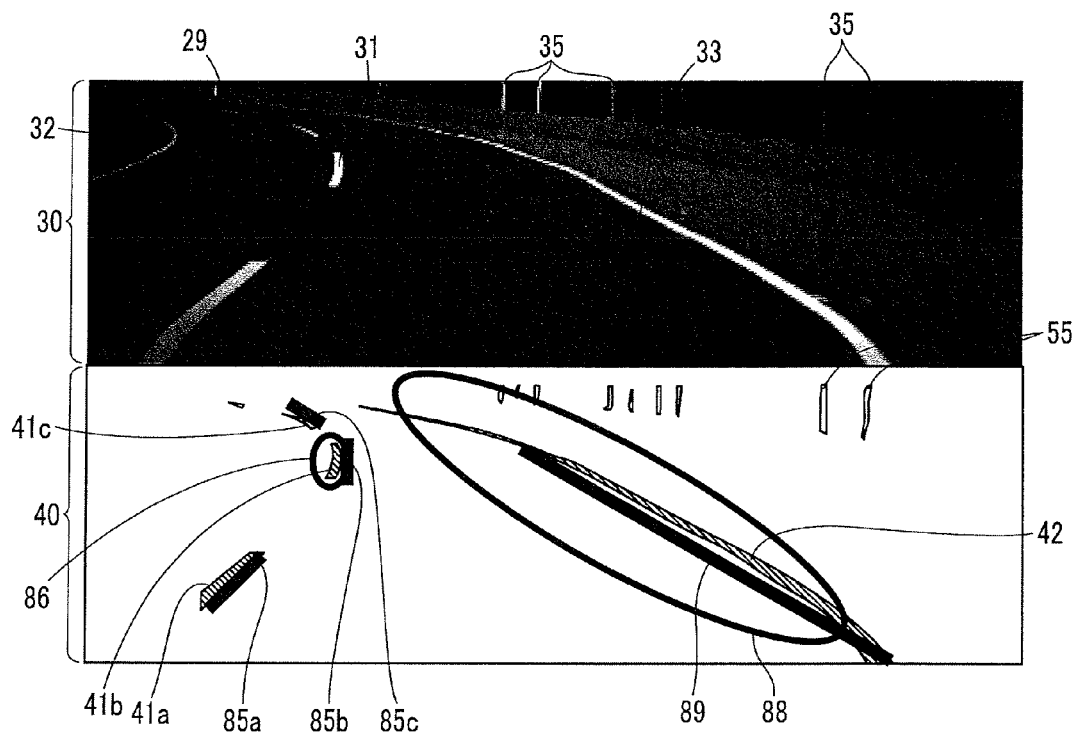
FIG. 9 is an explanatory diagram of segment substitution processing by a segment substituting unit.

In the linear element extraction image 40 of FIG. 9, for the convenience of explaining the segment substitution processing by the segment replacing unit 67, new reference characters have been assigned to the linear elements corresponding to the central lane mark 31 and the right lane mark 33 in the captured image 30. In FIG. 9, linear elements 41a to 41c denote a plurality of linear elements 41 derived from the dashed-line central lane mark 31 in the captured image 30, the suffixes a, b and c being assigned in order, a denoting the one closest to the vehicle 10. The linear element 42 is the linear element derived from the continuous-line right lane mark 33.

In the linear element extraction image 40 of FIG. 9, the linear elements 41a and 41c are shown as straight-line linear elements. The linear elements 41b and 42 are shown as curved linear elements. To focus attention on the curved linear elements, the linear elements 41b and 42 are enclosed by circles 86 and 88. The enclosing circles 86 and 88 are shown in FIG. 9 solely for the convenience of the explanation and do not exist in the actual linear element extraction image 40.

In the linear element extraction image 40, all linear elements are constituted of a set of horizontal rows of pixels continuing in the vertical direction. Further, in the linear element extraction image 40 of FIG. 9, the linear elements 41a to 41c and 42 have been extracted from the central lane mark 31 and the right lane mark 33. Thus, the set of the horizontal rows of pixels constituting each of the linear elements 41a to 41c and 42 has continuity in the vertical direction on the linear element extraction image 40 in terms of the horizontal width and the tilt angle.

The continuity in the vertical direction will be explained in detail. For example, with respect to horizontal rows of pixels that constitute linear elements and adjoin in the vertical direction, (a) the two horizontal rows of pixels have vertical continuity regarding the horizontal width if the difference in the horizontal width between the two horizontal rows of pixels falls within a predetermined threshold value. Further, (b) the two horizontal rows of pixels have vertical continuity regarding the tilt angle if the difference in the horizontal position of the horizontal central point between the two horizontal rows of pixels falls within a predetermined threshold value. The same tilt angle as the tilt angle θ defined on the local straight line 44 in FIG. 4 can be defined on the straight line connecting the horizontal central points of the two horizontal rows of pixels.

When discussing the continuity in the vertical direction on the horizontal rows of pixels adjoining in the vertical direction, the presence of the continuity may be determined on the basis of a group of a predetermined number of horizontal rows of pixels that continue in the vertical direction instead of determining the presence of continuity by comparing only two horizontal rows of pixels. More specifically, the mean value of the differences in the horizontal width or the mean value of the differences in the horizontal position of the central point is calculated on all pairs of the horizontal rows of pixels adjoining in the vertical direction in the group. If the mean values are within a predetermined threshold values, then it is determined that all the horizontal rows of pixels in the group have the continuity in the vertical direction.

The segment replacing unit 67 carries out labeling to impart one label to a set portion of a vertical range having the connectivity in the vertical direction on the horizontal rows of pixels constituting each linear element in the linear element extraction image 40 as a part of the processing in STEP21. The term "connectivity in the vertical direction" in this case refers to, for example, the "continuity in the vertical direction" mentioned above. Regarding the "continuity in the vertical direction" mentioned above, the continuity in the vertical direction has been determined from the tilt angle of the straight line that connects the central points of the horizontal rows of pixels on tilt angles. However, the connectivity in the vertical direction may be determined from the tilt angle of a straight line that connects left ends or right ends rather than limiting to the central points of the horizontal rows of pixels.

In STEP21, the segment replacing unit 67 imparts identification labels, one each to the linear elements 41*a* to 41*c* and 42 of the linear element extraction image 40 of FIG. 9 and substitutes them into replacement segments 85*a* to 85*c* and 89. Alternatively, the segment replacing unit 67 may carry out the processing in STEP21 only on the lane extraction area 45 (FIG. 4) in the linear element extraction image 40 without carrying out the processing in STEP21 on every linear element in the linear element extraction image 40, thereby reducing the processing load.

For a curved linear element having a long dimension in the vertical direction, such as the linear element 42, even if it is a set portion of horizontal rows of pixels having the connectivity in the vertical direction, the segment replacing unit 67 may divide it into set portions having a predetermined length in the vertical direction, impart a different label to each of the divided portions, and substitute each of the divided portions into one segment. Generated according to this policy are replacement segments 891*a* to 891*c* in FIG. 10, which will be discussed hereinafter.

Substituting curved linear elements into segments was meant to permit easier detection of straight lines in STEP15 by restraining the scattering of voting targets in the voting process in STEP14. However, substituting a long curved linear element into one replacement segment results in an increased difference between the tilt angle of each element portion of the curved linear element and the tilt angle of the replacement segment, thus causing the direction of the straight line detected in STEP15 to significantly deviate from the direction of a lane mark in the real space although the scattering of votes in STEP14 is restrained. Hence, the segment replacing unit 67 imparts a different label to each divided portion so as to substitute each divided portion into its corresponding segment thereby overcoming the problem.

The method used by the segment replacing unit 67 to specifically determine the replacement segments 85*a* to 85*c* and 89 will now be explained. The segment replacing unit 67 sets the vertical length of each of the replacement segments 85*a* to 85*c* and 89 to be equal to the vertical length of each of the linear elements 41*a* to 41*c* and 42. In FIG. 9, the upper end of the replacement segment 89 has been set at a position which is in the middle of the linear element 42, from which the replacement segment 89 is derived, continuing upward in the vertical direction, and at which the horizontal width of the linear element 42 is below a predetermined threshold value. This is because it is less significant to recognize a portion of the lane mark that is sufficiently far and also because omitting the recognition processing permits a reduced processing load.

The segment replacing unit 67 sets the widths of the replacement segments 85*a* to 85*c* and 89 to be equal irrespectively of the widths of the linear elements 41*a* to 41*c* and 42, from which the replacement segments 85*a* to 85*c* and 89 are derived, and uniforms the widths thereof over the range between both ends.

If the linear element from which a segment is derived is a straight-line linear element, then the segment replacing unit 67 sets the tilt angles of the derivative replacement segments 85*a* and 85*c* to the tilt angles of the origin linear elements. The segment replacing unit 67 repeatedly carries out, from bottom to top in the vertical direction in order, the processing for drawing a segment from the center of a bottom horizontal row of pixels to the center of the next bottom horizontal row of pixels on the horizontal rows of pixels at a plurality of different vertical positions of a linear element. A change in the tilt angle of each segment obtained by the processing makes it possible to determine whether the linear element is a straight-line linear element or a curved linear element.

The segment replacing unit 67 may select and set the tilt angles of the replacement segments 85*b* and 89 derived from the curved linear elements 41*b* and 42 to appropriate tilt angles in the range between a maximum value and a minimum value of the tilt angles of individual portions of the origin linear elements. More specifically, the segment replacing unit 67 calculates the tilt angles of the replacement segments 85*b* and 89 according to, for example, (a) shown below. The calculation may alternatively be carried out according to other methods as in the following (b) to (d). The following calculation methods are used for both the linear elements 41*b* and 42, so that the description will be given only in relation to the linear element 41*b*.

(a) An approximate curve is prepared by the least squares method, using the pixels constituting the linear element 41*b* as distribution points, and both vertical ends of the approximate curve are set to coincide with both vertical ends of the linear element 41*b*. Then, the tilt angle of the tangent line at the central point of the length of the approximate curve is set to the tilt angle of the replacement segment 85*b*.

(b) The mean value of the tilt angles of the tangent lines at both ends of the approximate curve in the aforesaid (a) is set to the tilt angle of the replacement segment 85*b*.

(c) Divisional points are set at equal intervals on the approximate curve in the aforesaid (a), and the mean value of the tilt angles of the tangent lines at the divisional points is adopted as the tilt angle of the replacement segment 85*b*.

(d) The mean value of the tilt angles of the segments connecting the central pixels of the horizontal rows of pixels at the top and bottom ends of the linear element 41*b* is adopted as the tilt angle of the replacement segment 85*b*.

The segment replacing unit 67 sets the positional relationship between a linear element and the replacement segment into which the linear element is substituted, for example, as follows. Since both vertical ends of the replacement segment are aligned with both vertical ends of the linear element, the vertical position of the replacement segment will be uniquely determined. The horizontal position of the replacement segment is set such that the center of the width of the replacement segment is aligned with the center of the width of the linear element at one arbitrary vertical position (e.g., the vertical position of the vertical central point) in the vertical range of the linear element or, if possible, at a plurality of vertical positions. In short, it is required that the horizontal position of a replacement segment is set such that the replacement segment overlaps the linear element, from which the replacement segment is derived, at least at one location.

In FIG. 9, the origin linear elements 41*a* to 41*c* and 42 and the derivative replacement segments 85*a* to 85*c* and 89 are placed slightly apart from each other in the horizontal direction. This, however, has been made simply to make the chart easy to see, and the origin linear elements 41*a* to 41*c* and 42 and the derivative replacement segments 85*a* to 85*c* and 89 are overlapped in actual processing.

Figure 10:
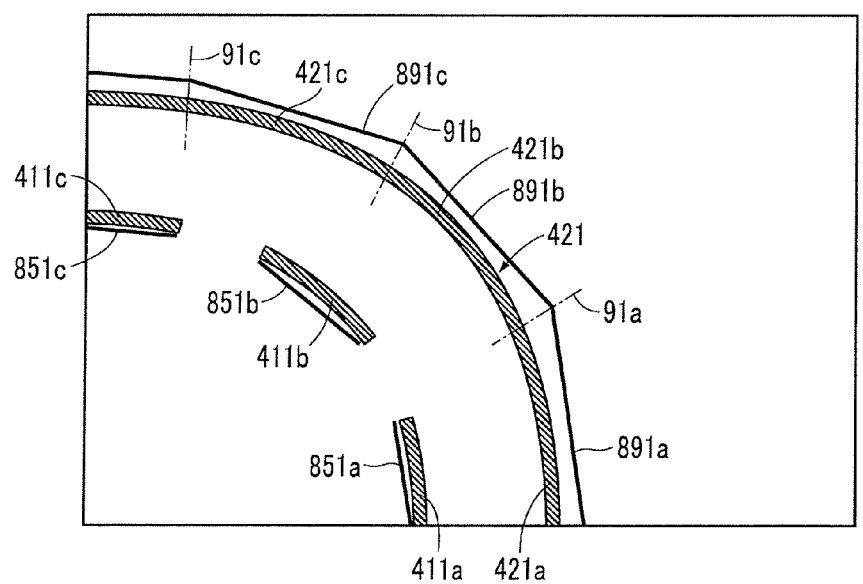
FIG. 10 is a diagram illustrating a projectively transformed image obtained by projectively changing a linear element extraction image.

The lane recognition device 65 may adopt the replacement segments 851a to 851c and 891a to 891c in FIG. 10 instead of the replacement segments 85a to 85c and 89 substituted from the linear elements 41a to 41c and 42 of the linear element extraction image 40. FIG. 10 illustrates a projectively transformed image 70 generated by the intermediate extraction image generator 66 by subjecting the linear element extraction image 40 to top-view projective transformation.

The captured image 30, from which the linear element extraction image 40 is produced, is the image of the view ahead of the vehicle 10 observed from the camera 11. Hence, farther portions of the central lane mark 31, the right lane mark 33 and the like on the captured image 30 move closer to the center on the captured image 30 or the reduction percentage in the captured image 30 increases. This inconveniently leads to an increased difference between the shape of a linear element on the linear element extraction image 40 and the shape of the lane mark drawn on the road surface in the real space, thus setting an inaccurate replacement segment.

The projectively transformed image 70 is generated to prevent such an inaccurate replacement segment from being set. The transformation from the linear element extraction image 40 to the projectively transformed image 70 is carried out by the intermediate extraction image generator 66 as a part of the processing in STEP21. In the projectively transformed image 70, the linear elements 41a to 41c and 42 of the linear element extraction image 40 have been transformed into the linear element portions 411a to 411c and 421, respectively, by top-view projective transformation. The distortions in the shapes of the linear element portions 411a to 411c and 421 in the projectively transformed image 70 caused by the difference in distance from the vehicle 10 have been eliminated.

In the lane recognition device 65, which carries out the projective transformation, the linear element extraction image 40 corresponds to the second intermediate extraction image in the present invention, the projectively transformed image 70 before the processing for substituting each linear element into a replacement segment corresponds to the first intermediate extraction image in the present invention, and the projectively transformed image 70 after the processing for substituting each linear element into a replacement segment corresponds to the linear element extraction image in the present invention that sets local areas for determining local straight lines.

Since the linear element 421 is derived from the continuous-line right lane mark 33, if the segment replacing unit 67 carries out the labeling on the linear element 421 on the basis of the vertical connectivity to attach one label thereto so as to substitute it into one replacement segment, then the difference between the tilt angle of the replacement segment and the tilt angle of each element portion of the linear element 421 would inconveniently increase. To cope with this, the segment replacing unit 67 divides the linear element 421 along the central line into a plurality of linear elements 421a to 421c, which have an equal length, by partitions 91a to 91c along the central line, and then labels each of the linear elements 421a to 421c so as to substitute them into the replacement segments 891a to 891c.

The lane recognition device 65 replaces the projectively transformed image 70, which has been substituted into the replacement segments 851a to 851c and 891a to 891c, into the linear element extraction image 40 in STEP21, and then carries out the processing in STEP13 and after in FIG. 8 on the projectively transformed image 70 after the substitution.

Referring now to FIG. 11 to FIG. 14, another method for recognizing a lane boundary line on a curved road by the lane recognition device 20 in FIG. 2 will be described. The lane recognition method in FIG. 11 to FIG. 14 is described using the linear element extraction image 40 in FIG. 4 to be processed by the lane recognition device 20 in FIG. 2. However, the lane recognition method in FIG. 11 to FIG. 14 can be applied also to the lane recognition device 65 by replacing the projectively transformed image 70 in FIG. 10 created by the lane recognition device 65 (FIG. 7) by the linear element extraction image 40.

In FIG. 11 to FIG. 14, the same elements or STEPs as those in FIG. 2 to FIG. 5 will be assigned the same reference numerals as those assigned to the elements or STEPs in FIG. 2 to FIG. 5.

Figure 11:
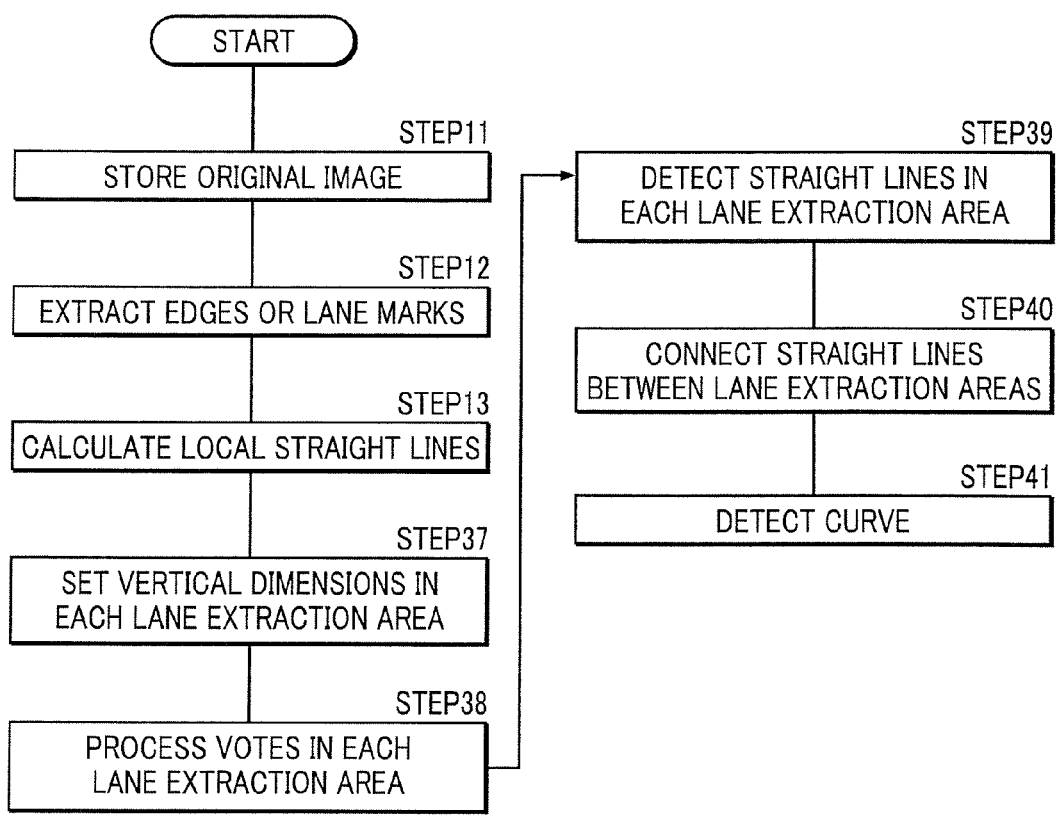
FIG. 11 is a flowchart illustrating another recognition method related to a curved lane boundary line.
Figure 12:
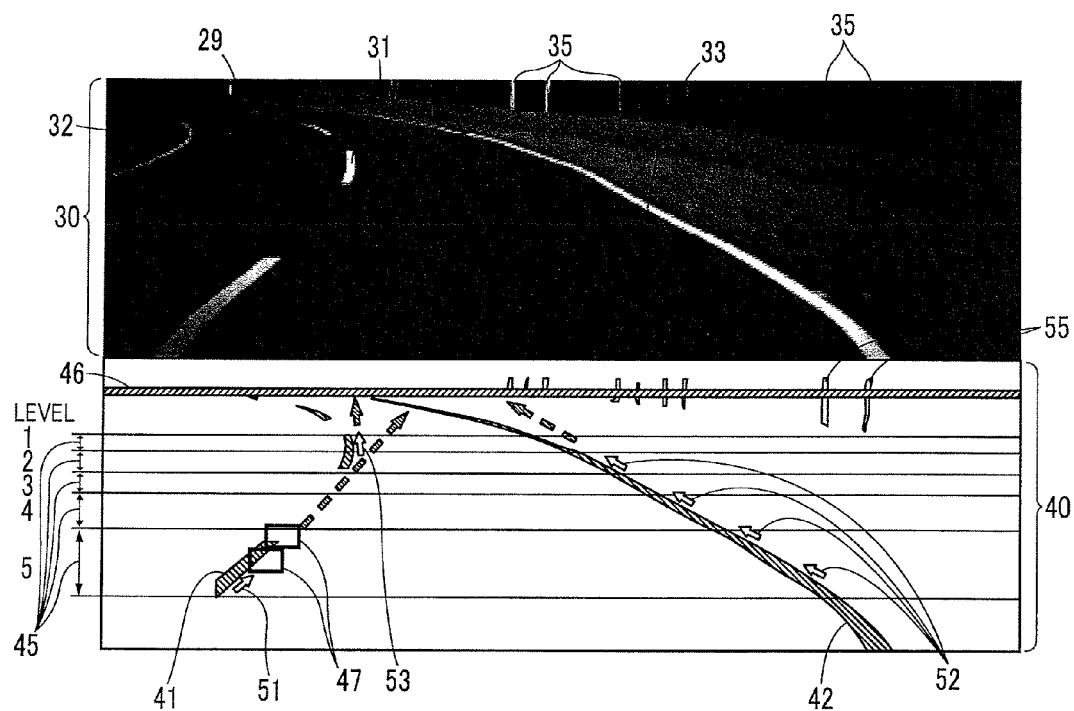
FIG. 12 is an explanatory diagram of a lane extraction area in another recognition method shown in FIG. 11.

The processing in STEP11 to STEP13 of FIG. 11 is the same as that in STEP11 to STEP13 of FIG. 3, so that the description thereof will be omitted. In STEP37, the linear element extraction image processor 22 sets the vertical dimension (the dimension in the y-axis direction) of each lane extraction area 45. To be specific, as illustrated in FIG. 12, a predetermined range in the linear element extraction image 40 is divided into five lane extraction areas 45 in the y-axis direction, and the dimension in the y-axis direction is set to be smaller for the lane extraction area 45 at a higher level. The dimensions in the y-axis direction of the lane extraction areas 45 are set to become equal (e.g., a predetermined value in the range of 10 to 15 m) to each other when converted into dimensions in the real space.

The dimension of each of the lane extraction areas 45 in the y-axis direction may be fixed; preferably, however, the dimension is adjusted according to the traveling situation of the vehicle 10 (the traveling situation including a driving situation). The initial value of the dimension of each of the lane extraction areas 45 in the y-axis direction at a driving start of the vehicle 10 is set such that the dimension of each of the lane extraction areas 45 in the y-axis direction is, for example, 10 m long, on the vehicular central line of the vehicle 10 in the real space.

Thereafter, the dimension of each of the lane extraction areas 45 in the y-axis direction is changed according to the vehicle speed. In general, the dimension of each of the lane extraction areas 45 in the y-axis direction is increased as the vehicle speed increases. As the dimension of the lane extraction area 45 in the y-axis direction increases, the quantity of the lane extraction areas 45 may be decreased. The dimension of each of the lane extraction areas 45 in the y-axis direction is maximum when the road 29 is a straight line, and the dimension is decreased as the curvature of the road 29 increases.

Figure 13:
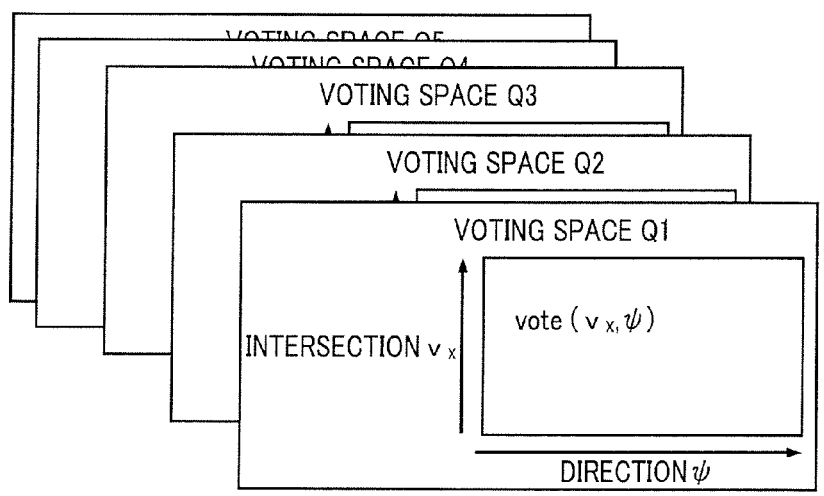
FIG. 13 is a diagram illustrating a plurality of voting spaces generated for each lane extraction area in another recognition method shown in FIG. 11.

The lane extraction areas 45 are assigned labels 1, 2, . . . , 5 in this order from the top to the bottom for the purpose of processing. As illustrated in FIG. 13, one voting space is set for each of the lane extraction areas 45. Voting spaces Q1 to Q5 in FIG. 13 are associated with the lane extraction areas 45 of labels 1 to 5 in FIG. 12. The lane extraction areas 45 with smaller level values (the lane extraction areas 45 closer to the top) have lower positional resolutions of the areas of interest in the captured image 30 and the linear element extraction image 40.

The positional resolution of an area of interest in the linear element extraction image 40 is defined in the same manner as the positional resolution of the area of interest in the captured image 30 explained in relation to expressions (3) and (4) in the aforesaid STEP133. In other words, the positional resolution of the area of interest in the linear element extraction image 40 refers to the resolution used to identify the positional difference in the real space corresponding to the area of interest by the image information on the area of interest in the linear element extraction image 40. The directional resolution of the area of interest in the linear element extraction image 40 refers to the resolution used to identify the directional difference in the real space corresponding to the area of interest by the image information on the area of interest in the linear element extraction image 40. The intersectional resolution of the area of interest in the linear element extraction image 40 refers to the resolution used to identify the positional difference on a straight line corresponding to the reference horizontal line 46 in the real space by the image information on the area of interest in the linear element extraction image 40 in the case where the reference horizontal line 46 is set in the area of interest.

In the captured image 30 and the linear element extraction image 40, the positional resolution deteriorates as the area of interest is an image portion that shows a view farther from the vehicle 10. Accordingly, the intersectional resolution and the directional resolution also deteriorate as the area of interest is an image portion that shows a view farther from the vehicle 10. In relation to the intersection of the local straight line 44 of each image portion of each of the linear element extraction image 40 and the reference horizontal line 46, the detection accuracy of the detection from the image portion which is the detection accuracy of the position in the real space corresponding to an intersection deteriorates on the intersection concerning the local straight line 44 of an image portion with a low intersectional resolution. In relation to the direction of the straight line (including the local straight line 44) of each image portion of each of the linear element extraction image 40 and the reference horizontal line 46, the detection accuracy of the detection from the image portion which is the detection accuracy of the direction of the straight line in the real space corresponding to the straight line deteriorates on the direction of the local line of an image portion with a low directional resolution.

In order to match the intersectional resolution and the directional resolution to the positional resolution of each portion on the linear element extraction image 40, the intersectional resolution and the directional resolution of the lane extraction area 45 at a higher level are reduced, and then vx and ψ are calculated. Further, in order to match the intersectional resolution and the directional resolution to the coordinate components of a voting space, the values of the coordinate components of each of the voting spaces Q1 to Q5 are defined by associating them with the discrete values of the tilt angle θ and the x intersection on a local straight line in the lane extraction area 45 of a level to which the voting space corresponds.

In STEP38, for the individual lane extraction areas 45, the voting processor 24 casts votes to the corresponding voting spaces Q1 to Q5. Thus, the number of votes vote (vx, ψ) for each of the voting spaces Q1 to Q5 is obtained.

Figure 14:
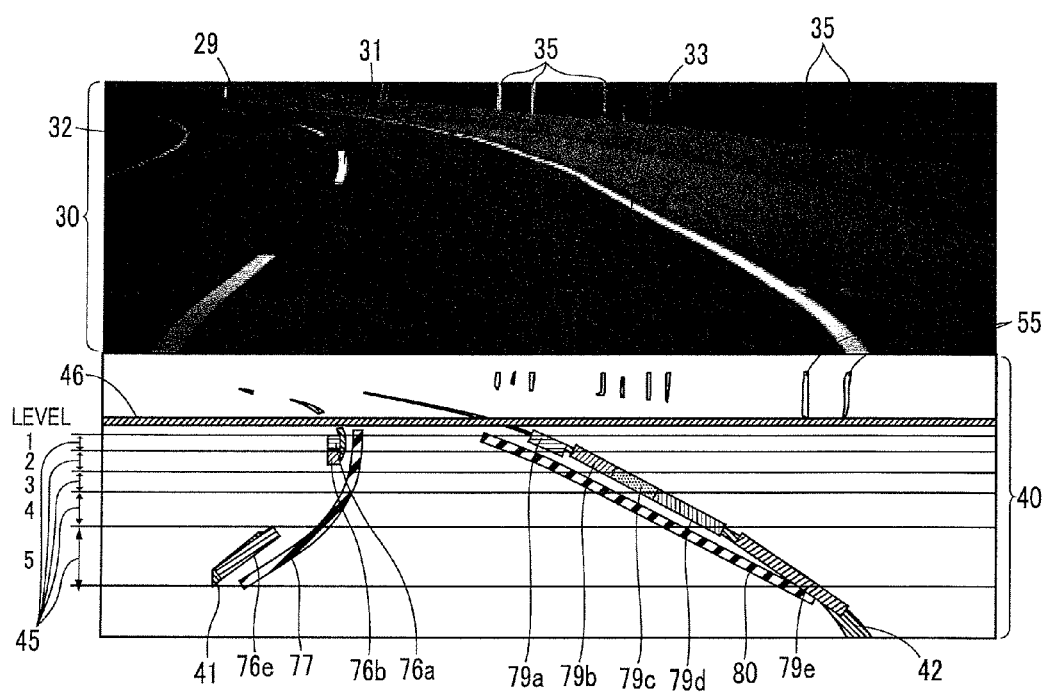
FIG. 14 is a diagram illustrating a detection straight line detected from each lane extraction area in another recognition method shown in FIG. 11.

In STEP39, the straight line detector 25 detects detection straight lines for each of the lane extraction areas 45 on the basis of the number of votes vote (vx, ψ) of each of the voting spaces Q1 to Q5. FIG. 14 illustrates the detection straight lines detected for each of the lane extraction areas 45 by the straight line detector 25. A left detection straight line 76a and a right detection straight line 79a are detected in the voting space Q1 (=a voting space 56 of level 1), a left detection straight line 76b and a right detection straight line 79b are detected in the voting space Q2 (=the voting space 56 of level 2), a right detection straight line 79c is detected in the voting space Q3 (=the voting space 56 of level 3), a right detection straight line 79d is detected in the voting space Q4 (=the voting space 56 of level 4), and a left detection straight line 76e and the right detection straight line 79e are detected in the voting space Q5 (=the voting space 56 of level 5).

In STEP40, the recognizer 26 connects the detection straight lines in each of the lane extraction areas 45 between the lane extraction areas 45. The connection beyond the lane extraction area 45 in this case includes the connection of the detection straight lines between lane extraction areas 45 that jump one or more lane extraction areas 45 therebetween in the y-axis direction rather than limiting to the connection of the detection straight lines in the lane extraction areas 45 adjoining in the y-axis direction. This is because there are cases where there are no detection straight lines to be connected in one or more other lane extraction areas 45 in the y-axis direction if a lane mark is the dashed-line type like the central lane mark 31.

In STEP41, the recognizer 26 recognizes the lane boundary line of the curve on the basis of the detection straight lines connected in STEP40. More specifically, a lane boundary line 77 corresponding to the central lane mark 31 of the dashed-line lane mark is recognized from the connection of the left detection straight lines on the left side 76a, 76b and 76e. Further, a lane boundary line 80 corresponding to the right lane mark 33 of the continuous-line lane mark is recognized from the connection of the right detection straight lines 79a to 79e on the right side.

Figure 15:
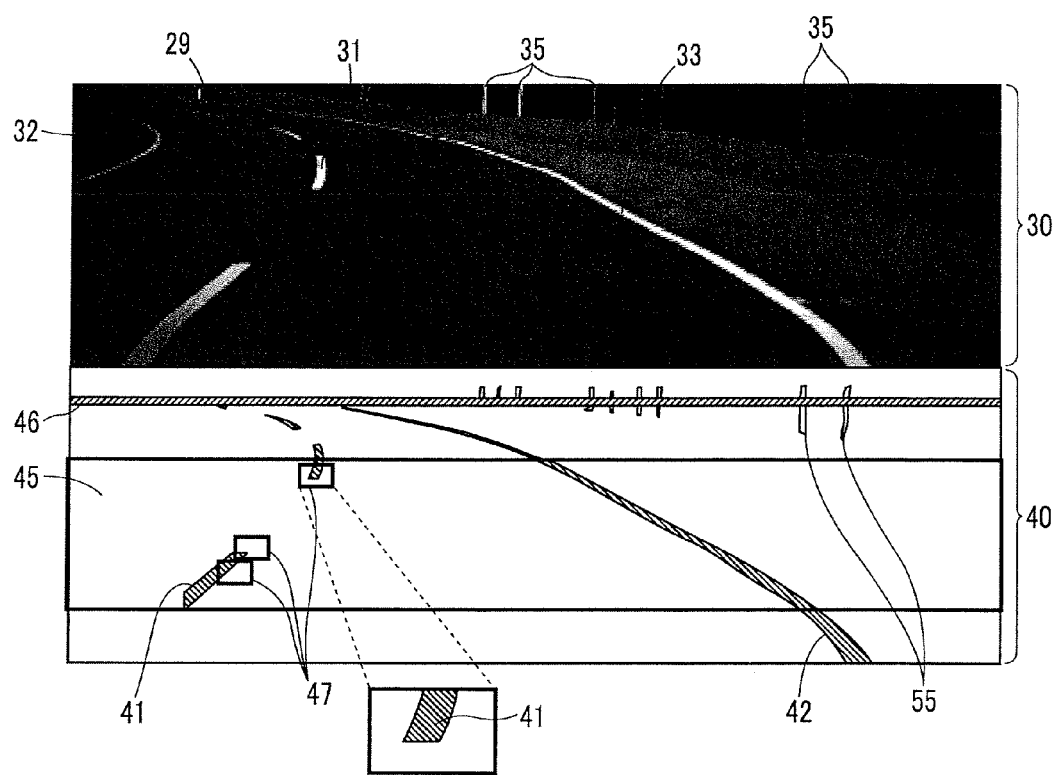
FIG. 15 is an explanatory diagram illustrating an adjustment of the number of sections in the direction of a local straight line on the basis of a position of a local area in one lane extraction area.

FIG. 15 is an explanatory diagram illustrating an improved example of the processing for calculating the directions of local straight lines by the lane recognition device 20 (FIG. 2) described in relation to FIG. 4. The improved example can be applied also to the lane recognition device 65 (FIG. 7) by replacing the linear element extraction image 40 of FIG. 15 with the projectively transformed image 70 of FIG. 10.

In FIG. 15, the number of sections of the tilt angle θ is changed on the local area 47 in one lane extraction area 45 according to the y-coordinate of the local area 47. Hence, according to the aforesaid (3), the number of sections of ψ also changes according to the y-coordinate of the local area 47. As described above, the y-coordinate of the local area 47 is the y-coordinate of a predetermined point, e.g., the central point, in the local area 47. In the linear element extraction image 40, one pixel holds a greater amount of information in the local areas 47 at higher levels, so that the directional resolution decreases.

For example, on the range of 0 to π of the tilt angle θ, the number of sections of ψ to be associated with the local straight lines in the local areas 47 corresponding to a position up to 40 m from the vehicle 10 in the real space (e.g., the two local areas 47 on the lower side in FIG. 15) is set to 32, and the number of sections of ψ to be associated with the local straight lines in the local area 47 corresponding to a position exceeding 40 m (e.g., the local area 47 at the top in FIG. 15) is set to 16.

A description will be given of two specific examples of a detection method for detecting detection straight lines by changing the number of sections of only ψ according to the position in the y-axis direction while fixing the number of sections of vx irrespectively of the position in the y-axis direction. According to a first detection method, as described in relation to FIG. 12, one voting space 56 is defined for each section type (one with a different number of sections being counted as one section type), i.e., each lane extraction area portion of the same section type, and the detection straight lines are detected on each lane extraction area portion of the same section type. In this case, the detection straight lines are connected in the y-axis direction thereby to recognize the lane boundary line in one lane extraction area 45.

According to a second method for detecting detection straight lines, one voting space 56 is defined, irrespectively of the number of sections of ψ. If it is assumed that, for example, the discrete values of ψ of the local straight lines of the local area 47, in which ψ has been divided into 16 sections, are defined alternately the discrete values of ψ of the local straight lines of the local area 47 divided into 32 sections (e.g., ψ=1, 3, 5, ..., 29, 31), then the discrete values are completely included in the discrete values of the local area 47 divided into 32 sections (e.g., ψ=0, 1, 2, 3, ..., 28, 29, 30, 31). Hence, one voting space 56 for dealing 32 sections on ψ can be shared for the 16 sections and the 32 sections on ψ.

Further, according to the second detection method, for the local straight lines of the local area 47 in which ψ is expressed by 32 sections, one vote is cast to the coordinate of the voting space 56 corresponding to the ψ. For the local straight lines of the local area 47 in which ψ is expressed by 16 sections, ½ vote each obtained by equalizing one vote is cast to a total of two coordinates, namely, the coordinate of the voting space 56 and the coordinate of the discrete value that is thereabove or therebelow by one, which correspond to the ψ. For the local straight lines with the 16-section ψ, in place of the ½ vote each, ⅓ vote each obtained by equalizing one vote may be cast to a total of three coordinates, namely, the coordinate of the voting space 56 and the coordinate of the discrete value that is thereabove by one and the coordinate of the discrete value that is therebelow by one, which correspond to the ψ.

More specifically, regardless of the number of sections of ψ, one vote is assigned to one local area 47, and the one vote for the local area 47 of a section type having a fewer sections is divided by the number of sections to a reduced value before distributed to a plurality of corresponding coordinates. Then, the vote (vx, ψ) in the voting space 56 is calculated and the detection straight line corresponding to the vote (vx, ψ) having a maximum value is detected.

Figure 16:
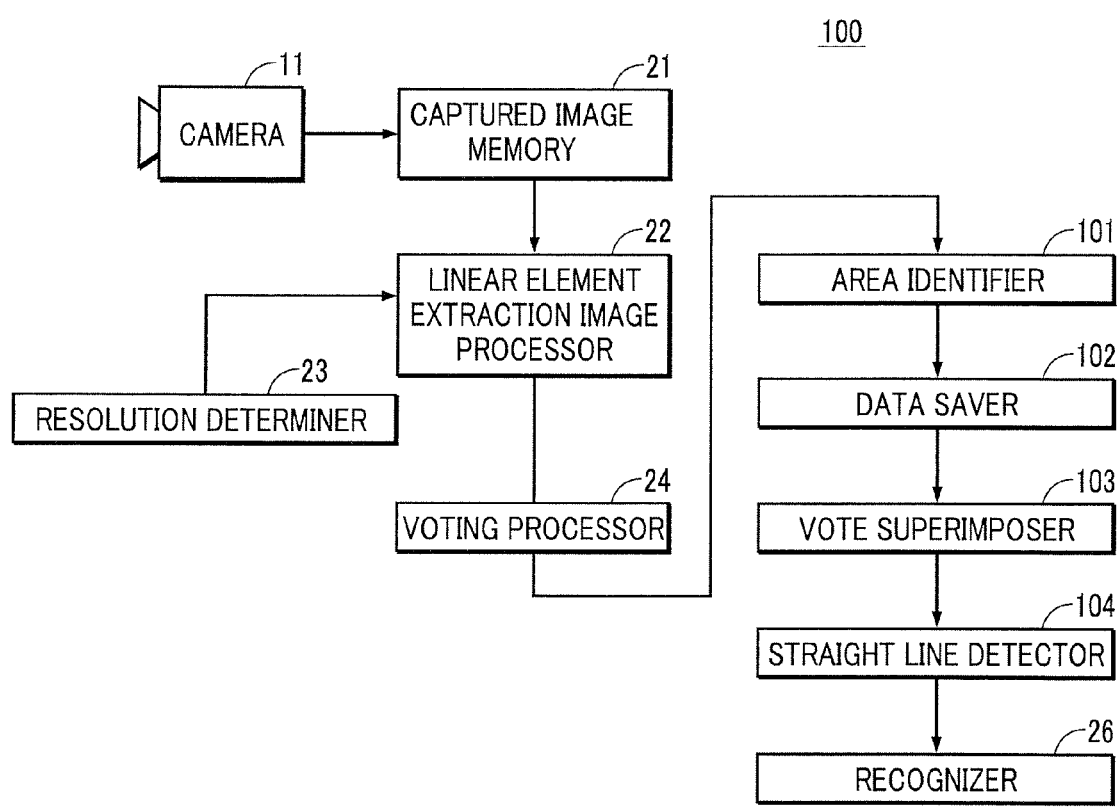
FIG. 16 is a block diagram illustrating yet another lane recognition device.

FIG. 16 is a block diagram of yet another lane recognition device 100. Among the constituent elements of the lane recognition device 100, the same constituent elements as those of the lane recognition device 20 in FIG. 2 will be assigned the same reference numerals assigned to the constituent elements of the lane recognition device 20, and the description thereof will be omitted. The lane recognition device 100 is provided with an area identifier 101, a data saver 102, a vote superimposer 103, and a straight line detector 104 in place of the voting processor 24 and the straight line detector 25 of the lane recognition device 20.

Figure 17:
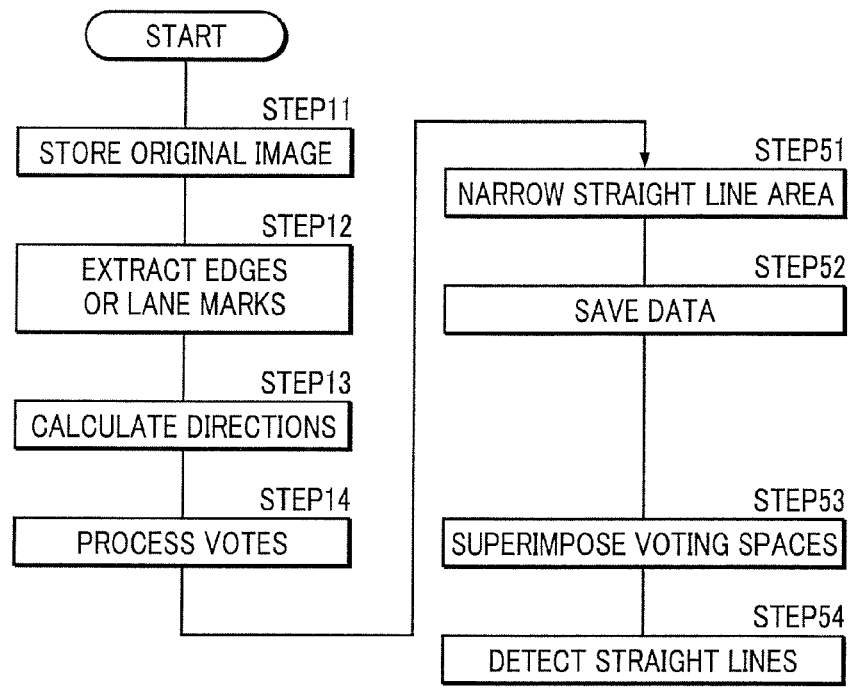
FIG. 17 is a flowchart illustrating a lane recognition method implemented by the lane recognition device in FIG. 16.

FIG. 17 is a flowchart of the lane recognition method implemented by the lane recognition device 100. In the flowchart of FIG. 17, the STEPs of the same processing as that of the STEPs in the flowchart of FIG. 3 described above are assigned the same STEP numbers as the STEP numbers assigned to the STEPs of the same processing in the flowchart of FIG. 3.

In the flowchart of FIG. 17, STEPs 51 to 54 have been added after STEP14 in the flowchart of FIG. 3. The STEPs 51, 52, 53 and 54 are carried out by the area identifier 101, the data saver 102, the vote superimposer 103, and the straight line detector 104, respectively.

Figure 18:
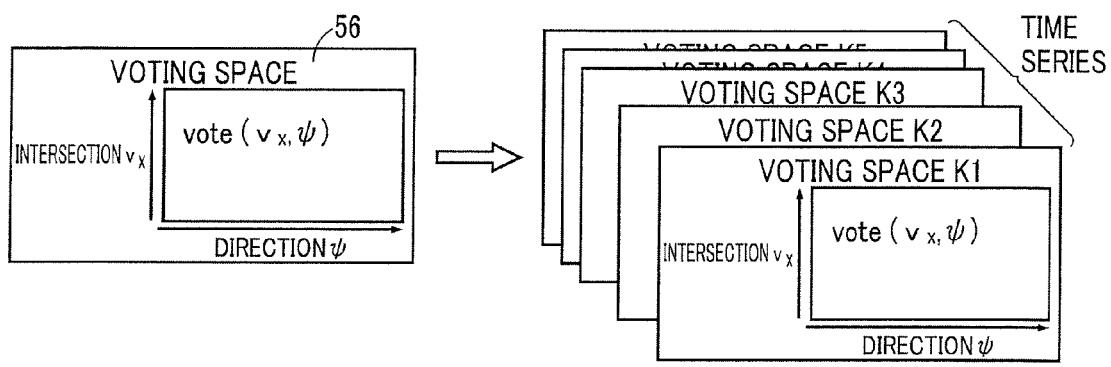
FIG. 18 is an explanatory diagram regarding time-series voting spaces.

FIG. 18 illustrates time-series voting spaces K1 to Kn (example: n=5) processed by the lane recognition device 100. The lane recognition device 20 in FIG. 2 recognizes the lane boundary line of the road 29 separately for one voting space 56 shown on the left side in FIG. 18. In contrast to this, the lane recognition device 100 in FIG. 16 recognizes the lane boundary line of the road 29 from an n quantity of the voting spaces K1 to Kn in time series shown on the right side in FIG. 18. In time series, the generating time interval of adjoining voting spaces is substantially equal to the imaging time interval of the captured image 30. In FIG. 18, the voting spaces K1 to Kn are arranged in the order of the imaging time of the origin captured images 30.

Regarding the time-series voting spaces K1 to Kn, each time a new captured image 30 is generated, the voting space derived from the oldest captured image 30 is replaced by the voting space derived from the latest captured image 30, and the voting spaces K1 to Kn are re-arranged in the chronological order. Hence, the time-series voting spaces K1 to Kn are always maintained to be an n quantity of latest voting spaces.

Further, typically, the lane recognition device 100 updates the recognition of the lane boundary line of the road 29 each time a new captured image 30 is generated, so that the updating interval of the recognition of the lane boundary line in the lane recognition device 20 is the same as the imaging interval of the captured image 30. The updating interval of the recognition of the lane boundary line by the lane recognition device 100 can be appropriately prolonged by setting the updating interval to an integral multiple (an integer of 2 or more) of the generating interval of the captured image 30.

The processing carried out by the lane recognition device 100 will be described with reference to the flowchart of FIG. 17. The processing in STEP11 to STEP14 in FIG. 17 is the same as the processing in STEP11 to STEP14 in FIG. 3, so that the description thereof will be omitted.

In STEP51, the area identifier 101 narrows an area on the voting space 56 on the basis of the voting result in the voting space 56 provided as the result of the processing in STEP14. In the voting spaces 56, the numbers of votes vote (vx, ψ) having maximum values that do not reach a threshold value W1 (W1>1) are considered to indicate votes derived from temporary noises rather than votes derived from a lane mark.

Figure 19A:
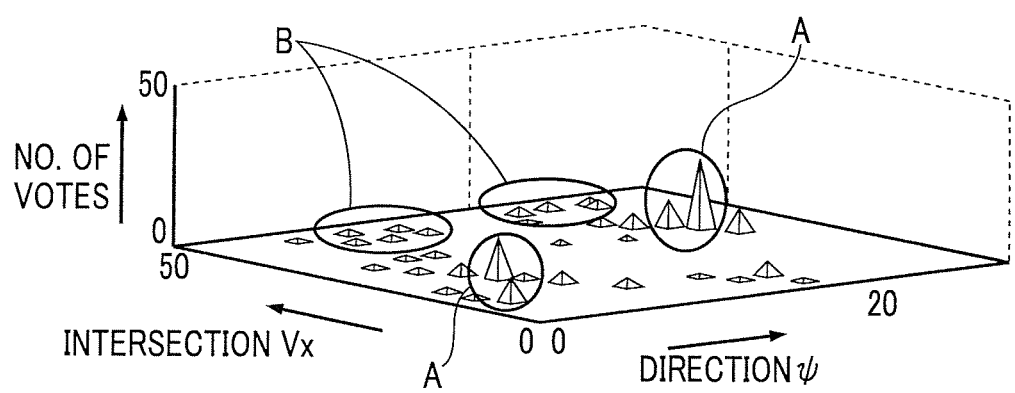
FIG. 19A and FIG. 19B are explanatory diagrams illustrating the processing on voting spaces carried out by the lane recognition device in FIG. 16.

Therefore, regarding the voting areas in which the numbers of votes vote (vx, ψ) having the maximum values that do not reach the threshold value W1 (W1>1), the numbers of votes vote (vx, ψ) of all coordinates included in the coordinate areas as the voting areas expanding downwards with the maximum values as the apexes thereof, namely, areas B in FIG. 19A, are cleared (set to 0). Instead of clearing the numbers of votes vote (vx, ψ), the numbers of votes vote (vx, ψ) may be reduced by an appropriate quantity.

Further, the numbers of votes vote (vx, ψ) are not cleared but maintained as they are in the coordinate areas in which the numbers of votes vote (vx, ψ) having the maximum values are the threshold value W1 or more, namely, areas A in FIG. 19A. W1 is typically the threshold value V1 or less described in connection with STEP14 in FIG. 3; however, W1 may take a value larger than the threshold value V1 or may be made variable according to driving conditions (e.g., a vehicle speed, a weather, a time zone or a road curvature).

In STEP52, the data saver 102 saves, in a predetermined memory, the data on the voting spaces 56, which has been processed by the area identifier 101. The data on the voting spaces 56, which has been processed by the area identifier 101, becomes the data on the numbers of votes vote (vx, ψ) only in the area A of the detection straight lines in a single linear element extraction image 40. The quantity of the linear element extraction images 40, the numbers of votes vote (vx, ψ) of which are saved in the predetermined memory, is limited to a predetermined number (e.g., the aforesaid n), and in the case where the quantity of the saved linear element extraction images 40 has already reached the predetermined number, the data on an oldest linear element extraction image 40 may be replaced by the data on a latest linear element extraction image 40 so as to save a required memory capacity.

As the result of the processing in STEPs 11 to 14 and 51 and 52 in FIG. 17, the time-series voting spaces K1 to Kn are generated, as illustrated on the right side in FIG. 18. The range in the y-axis direction of the lane extraction area 45 defined in each of the linear element extraction images 40 is the same irrespectively of the linear element extraction images 40. Therefore, the longitudinal lengths of the vehicle in the real space associated with the y-axis dimensions of the lane extraction areas 45 in the voting spaces K1 to Kn are the same as long as the vehicle speed remains the same.

The processing carried out in STEP53 by the vote superimposer 103 and the processing carried out in STEP54 by the straight line detector 104 is the processing on the total voting space set for the voting spaces K1 to Kn derived from the n quantity of time-series linear element extraction images 40 rather than individual processing on the voting space 56 derived from each of the linear element extraction image 40.

In STEP53, the vote superimposer 103 superimposes the voting spaces K1 to Kn defined relative to the time-series linear element extraction images 40. Superimposing the voting spaces K1 to Kn specifically means to generate a total voting space explained with reference to FIG. 19B, which will be discussed hereinafter.

The quantity n of the voting spaces K1 to Kn in each time series is typically fixed irrespectively of the traveling situation of the vehicle 10. However, the quantity n may be adjusted according to the vehicle speed or the curvature of the road 29. The time interval of the linear element extraction images 40 is fixed, so that the updating interval of the recognition of the lane boundary line can be shortened by reducing the quantity n as the vehicle speed increases. Further, a lane boundary line having a changing curvature of the road 29 can be promptly recognized by reducing the quantity n as the change in the curvature of the road 29 increases.

Figure 19B:
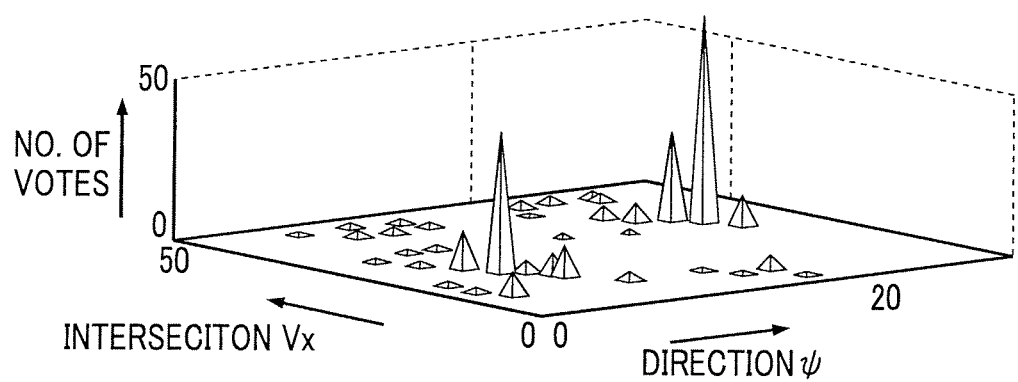

FIG. 19B illustrates a specific example of the total voting space generated as the result of the processing by the vote superimposer 103 in STEP53. In the following description, the total voting space vote (vx, ψ) will be denoted by t-vote (vx, ψ) so as to distinguish the total voting space from the individual vote (vx, ψ). The character "t" is used to mean "total."

t-vote (vx, ψ) denotes the total of votes (vx, ψ) of a plurality of linear element extraction images 40 (the time-series voting spaces) temporarily saved in the predetermined memory by the data saver 102 or in STEP52. More specifically, t-vote (vx, ψ) denotes a value obtained by totalizing the votes (vx, ψ) in the time-series voting spaces K1 to Kn with respect to the vote (vx, ψ) of each voting space 56, which has been subjected to the processing for narrowing to the votes (vx, ψ) of the areas A by excluding the votes (vx, ψ) of the noise areas B in FIG. 19A.

To be noted in this case, the real space associated with the voting spaces K1 to Kn does not remain the same range, but gradually changes into the range ahead of the vehicle in the vehicle traveling direction according to the vehicle speed as the vehicle 10 travels. Hence, the position and the direction of the real space associated with the coordinate (vx, ψ) in the voting spaces K1 to Kn differ among the voting spaces K1 to Kn.

Similarly, if the road 29 is a curved road, then the real spaces associated with the voting spaces K1 to Kn will be the same in relative areas with respect to the vehicle 10, but will be gradually dislocated in relation to the x-axis direction and the y-axis direction of the captured image 30, from which the voting space K1 is derived, the voting space K1, which is temporally the first, being the reference.

In the case where the difference in the imaging time of the captured images 30 from which the oldest voting space K1 and the latest voting space Kn are derived is small in the time series, the differences in the position and the direction of the real spaces associated with the same coordinates (vx, ψ) of the voting spaces K1 to Kn are small. Therefore, the votes (vx, ψ) of the same coordinates (vx, ψ) in the voting spaces K1 to Kn may be simply totalized to obtain t-vote (vx, ψ) of the total voting space.

In the case where the difference in the imaging time of the captured images 30 from which the oldest voting space K1 and the latest voting space Kn are derived is large in the time series, the difference in the positions in the real spaces associated with the same coordinates (vx, ψ) among the voting spaces K1 to Kn becomes unignorable. To cope with this, one of the voting spaces K1 to Kn (e.g., K1, Kn or the middle voting space) is set as the reference voting space, and the xy-coordinates of the linear element extraction image 40 from which the reference voting space is derived is set as a reference coordinate.

Then, the xy-coordinates of the linear element extraction images 40, from which voting spaces other than the reference voting space in the time series are derived, are converted into the reference coordinates of the reference voting space such that the same coordinates are associated with the same positions in the real space among the n quantity of voting spaces in the time series. Thereafter, (vx, ψ) are calculated as the xy-coordinates, which have been converted into the xy-coordinate of the reference voting space, and votes are cast to the (vx, ψ) of the individual voting spaces thereby to obtain the total voting space t-vote (vx, ψ). The conversion equation for converting the xy-coordinates of the linear element extraction images 40 into the reference coordinate of the reference voting space uses the vehicle speed or the turning angular velocity of the vehicle 10 as the calculation factors.

In STEP54, the straight line detector 104 detects the detection straight lines on the basis of the voting result of the total voting space. The recognizer 26 recognizes the lane boundary line on the basis of the detection straight lines detected by the straight line detector 104. The following will describe the specific method for detecting the detection straight lines by the straight line detector 104.

In the total voting space, the difference between the t-vote (vx, ψ) of the straight line derived from noises and the t-vote (vx, ψ) of the straight line corresponding to a lane mark becomes more conspicuous. This is because, in general, the votes derived from a lane mark tend to emerge in succession in the time-series captured images 30, whereas the votes derived from noises tend to emerge intermittently or only once in the time-series captured images 30. The straight line detector 104 sets a threshold value W2 (W2>W1) in the total voting space, and detects, as the detection straight lines, the straight lines having the x intersection and the tilt angle θ associated with the vx and ψ, respectively, of the coordinates (vx, ψ) having a t-vote (vx, ψ) of the threshold value W2 or more and also a maximum value.

In the case where the aforesaid reference voting space has been established in the time-series voting spaces, the (vx, ψ), based on which the detection straight lines have been detected, will be expressed by the reference coordinates of the reference voting space.

As with the case of the vote (vx, ψ) in one voting space 56 relative to a single linear element extraction image 40, for the t-vote (vx, ψ) also, only the straight lines associated with limited coordinates, which are the coordinates of t-vote (vx, ψ) of maximum values included in predetermined top numbers of maximum values in a total voting space, may be taken as the detection straight lines.

The straight line detector 104 is capable of carrying out the following processing. A temporally preceding linear element extraction image 40 and a temporally following linear element extraction image 40 in a time series are defined. The preceding linear element extraction image 40 and the following linear element extraction image 40 do not have to be adjacent linear element extraction images 40 in the time series. A distance L (in place of the distance L, a real-space distance obtained by converting the distance L may be used) on the voting space 56 between a preceding coordinate (vx, ψ) having a maximum number of votes in the voting space 56 corresponding to the preceding linear element extraction image 40 and the following coordinates (vx, ψ) having a maximum number of votes in the voting space 56 corresponding to the temporally following linear element extraction image 40 is calculated, and if the distance L is a threshold value L1 or more, then the number of votes vote (vx, ψ) of the preceding coordinates (vx, ψ) in the voting space 56 of the preceding linear element extraction image 40 is cleared.

As a result, the number of votes on the coordinates corresponding to the preceding coordinates (vx, ψ) is considerably reduced in the total voting space. As previously mentioned, a vote derived from a noise tends to emerge intermittently or only once in the time-series captured images 30. Accordingly, even when there are preceding coordinates in which the number of votes in the voting space 56 derived from one linear element extraction image 40 is a maximum value of W1 or more, if the votes are derived from noises, then it is highly likely that coordinates having a maximum value will not emerge if the number of votes is W1 or more within a predetermined distance from the following coordinates in the voting space 56 derived from the temporally following linear element extraction image 40. In this case, therefore, the detection straight lines derived from noises can be restrained from being detected by excluding the number of votes of the preceding coordinates (vx, ψ) of the preceding linear element extraction image 40 from the total in the total voting space.

Thus, the present invention has been described with reference to the embodiments. However, a variety of design changes can be added to the present invention within a scope that does not depart from the gist of the invention.

Although the term "voting space" has been used, this is merely a name used for the processing. More specifically, it is clearly understood by persons skilled in the art that the term is used as a place name used for the processing of counting the quantity of local straight lines having the same characteristics (vx and ψ in the embodiments) among a plurality of local straight lines of a lane extraction area. Accordingly, even if a different name is used, it is within the scope of the gist of the present invention as long as the processing contents are the same.

INDUSTRIAL APPLICABILITY

The lane recognition device in accordance with the present invention is mounted in an automobile to detect the positions of a road and a lane on which the automobile is traveling. The lane recognition device can be used to conduct various types of control, such as the avoidance of a collision with a predetermined object on a road or self drive, on the basis of a road or lane detected by the lane recognition device in accordance with the present invention.

DESCRIPTION OF REFERENCE NUMERALS

10 . . . vehicle; 11 . . . camera (imaging device); 20, 65, 100 . . . lane recognition device; 21 . . . image memory; 22 . . . linear element extraction image processor; 23 . . . resolution determiner; 24 . . . voting processor; 25, 104 . . . straight line detector; 26 . . . recognizer; 29 . . . road; 30 . . . captured image; 31 . . . central lane mark; 32 . . . left lane mark; 33 . . . right lane mark; 40 . . . linear element extraction image; 41, 42 . . . linear element; 44 . . . local straight line; 45 . . . lane extraction area; 46 . . . reference horizontal line; 47 . . . local area; 56 . . . voting space; 66 . . . intermediate extraction image generator; 67 . . . segment replacing unit; 70 . . . projectively transformed image; 76 . . . left detection straight line; 77, 80 . . . lane boundary line; 79 . . . right detection straight line; 101 . . . area identifier; 102 . . . data saver; and 103 . . . vote superimposer.

The invention claimed is:

1. A lane recognition device which recognizes a lane on the basis of a captured image of a view ahead of a vehicle obtained by an imaging device, comprising:
   a linear element extraction image generating unit which generates a linear element extraction image into which linear elements included in the captured image have been extracted;
   an area setting unit which sets a lane extraction area in a predetermined range in a vertical direction in the linear element extraction image;
   a local straight line determining unit which determines a local straight line of each local area on the basis of a linear element part in each local area with respect to each local area in the lane extraction area;
   an intersection calculating unit which calculates an intersection of each local straight line and a reference horizontal line at a predetermined position in a vertical direction;
   a voting unit which votes on a direction and an intersection of each local straight line in a voting space having a direction and an intersection as coordinate components;
   a detecting unit which detects a detection straight line on the basis of a voting result in the voting space; and
   a recognizing unit which recognizes a lane boundary line based on the detection straight line,
   wherein the area setting unit divides the linear element extraction image into a plurality of lane extraction areas in the vertical direction,
   the voting unit casts a vote to each voting space associated with each lane extraction area on the basis of each local straight line of the lane extraction area associated with the voting space,
   the detecting unit detects the detection straight line for each lane extraction area on the basis of the voting result of each voting space,
   the recognizing unit recognizes a lane boundary line in the linear element extraction image on the basis of connected detection straight lines of each lane extraction area,
   the local straight line determining unit divides a direction of a predetermined range into a first predetermined number of directional sections and determines the direction of each local straight line by assigning the direction of each local straight line to a corresponding directional section,
   the intersection calculating unit divides the reference horizontal line into a second predetermined number of positional sections and determines the intersection of each local straight line and the reference horizontal line by assigning the intersection to an intersectional section serving as a corresponding positional section, and the voting unit makes coordinate components of a direction and an intersection defined in the voting space coincide with the directional section and the intersectional section.

2. The lane recognition device according to claim 1, wherein the area setting unit divides the linear element extraction image into a plurality of vertically stacked lane extraction areas with each lane extraction area being a layer having a vertical dimension, wherein the vertical dimension of each lane extraction area decreasing at a higher layer in the vertical direction.

3. The lane recognition device according to claim 1, wherein the first predetermined number or the second predetermined number is set to be smaller in a lane extraction area at a higher level than in a lane extraction area at a lower level.

4. The lane recognition device according to claim 1, wherein the first predetermined number or the second predetermined number is set to be smaller in a local area at a higher level than in a local area at a lower level in the same lane extraction area.

5. The lane recognition device according to claim 1, wherein the detecting unit detects, as the detection straight line, a straight line that has a direction and an intersection associated with a coordinate having a maximum number of votes in the voting space.

6. The lane recognition device according to claim 1, wherein a horizontal direction of the captured image corresponds to a lateral direction of a vehicle in a real space, and
the recognizing unit recognizes that a lane boundary line is curved in a case where the recognizing unit determines that the detection straight line is changing at a velocity of a threshold value or more in the horizontal direction on the linear element extraction image on the basis of time-series linear element extraction images.

7. The lane recognition device according to claim 1, wherein the linear element extraction image generating unit comprises:
an intermediate extraction image generating unit which generates a first intermediate extraction image into which a linear element contained in the captured image has been extracted; and
a segment replacing unit which substitutes each linear element contained in the first intermediate extraction image into one or a plurality of segments on the basis of a vertical change in a horizontal width or a tilt angle thereof so as to generate the linear element extraction image from the first intermediate extraction image.

8. The lane recognition device according to claim 7, wherein the intermediate extraction image generating unit generates a second intermediate extraction image extracted from the captured image while holding a linear element included in the captured image at a same position as the position in the captured image, and projectively transforms the second intermediate extraction image into a top-view image thereby to generate the first intermediate extraction image.

9. The lane recognition device according to claim 1, wherein the voting unit sets the voting space for each time-series lane extraction area that has been set for the time-series linear element extraction image generated in association with a time-series captured image, and votes on a direction and an intersection of a local straight line of each local area in a lane extraction area, in which the voting space has been set, for each of the time-series voting spaces, and
the detecting unit detects detection straight lines on the basis of a voting result of the time-series voting space.

10. The lane recognition device according to claim 9, wherein the detecting unit prepares a total voting space in which a number of the votes on individual coordinates becomes a total value obtained by totalizing the numbers of votes on corresponding coordinates in the individual time-series voting spaces, and detects the detection straight line on the basis of a coordinate having a maximum number of votes in the total voting space.

11. The lane recognition device according to claim 10, wherein the detecting unit reduces the number of votes on a coordinate whose number of votes is below a threshold value in each of the voting spaces and then totalizes the numbers of votes on the individual coordinates in the individual time-series voting spaces.

12. The lane recognition device according to claim 10, wherein the detecting unit compares voting results of a first and a second voting spaces at different clock times on a time series, and in a case where a coordinate within a predetermined distance range from a coordinate having a maximum number of votes in the first voting space does not have a maximum number of votes in the second voting space, the detecting unit excludes the number of votes on the coordinate in the first voting space from the total in the total voting space.

\* \* \* \* \*